(12) United States Patent
Sankai

(10) Patent No.: US 8,650,135 B2
(45) Date of Patent: Feb. 11, 2014

(54) BUILDING MANAGEMENT APPARATUS

(75) Inventor: Yoshiyuki Sankai, Ibaraki (JP)

(73) Assignee: University of Tsukuba, Ibaraki (JP)

( * ) Notice: Subject to any disclaimer, the term of this patent is extended or adjusted under 35 U.S.C. 154(b) by 365 days.

(21) Appl. No.: 13/054,603

(22) PCT Filed: Jun. 30, 2009

(86) PCT No.: PCT/JP2009/061985
§ 371 (c)(1),
(2), (4) Date: Jan. 18, 2011

(87) PCT Pub. No.: WO2010/013572
PCT Pub. Date: Feb. 4, 2010

(65) Prior Publication Data
US 2011/0125327 A1   May 26, 2011

(30) Foreign Application Priority Data

Jul. 28, 2008 (JP) ................ 2008-193786

(51) Int. Cl.
G06F 15/18 (2006.01)
(52) U.S. Cl.
USPC ......................................... 706/12
(58) Field of Classification Search
USPC ......................................... 706/12
See application file for complete search history.

(56) References Cited

U.S. PATENT DOCUMENTS

| 6,895,308 B2* | 5/2005 | Coogan | 700/276 |
| 2003/0048926 A1 | 3/2003 | Watanabe | |
| 2006/0009862 A1* | 1/2006 | Imhof et al. | 700/19 |
| 2007/0014552 A1* | 1/2007 | Ebisawa | 396/51 |

FOREIGN PATENT DOCUMENTS

| JP | 07-154856 | 6/1995 |
| JP | 2000-293540 | 10/2000 |
| JP | 2002-304681 | 10/2002 |
| JP | 2003-087771 | 3/2003 |
| JP | 2004-178129 | 6/2004 |

(Continued)

OTHER PUBLICATIONS

Krumm, John, et al. "Multi-camera multi-person tracking for easyliving." Visual Surveillance, 2000. Proceedings. Third IEEE International Workshop on. IEEE, 2000.*

(Continued)

*Primary Examiner* — Jeffrey A Gaffin
*Assistant Examiner* — James F Sugent
(74) *Attorney, Agent, or Firm* — IPUSA, PLLC

(57) ABSTRACT

A building management apparatus that can provide a comfortable environment based on diligent control is provided. A building management apparatus 1 in a building having a plurality of areas according to the present invention includes a prediction unit 9a to predict a destination of a move of a person, a control unit 9b to control equipment inclusive of main equipment 10-13 or sub-equipment 14, 15 installed in the building based on the destination of the move, one or more imaging units 2-7 to capture images of at least one of the plurality of areas, and a human-flow-line detecting unit 9c to detect a person and a flow line of the person from the images captured by the imaging units 2-7, wherein the prediction unit 9a predicts the destination of the move of the person based on the flow line.

11 Claims, 19 Drawing Sheets

(56) References Cited

FOREIGN PATENT DOCUMENTS

| | | |
|---|---|---|
| JP | 2005-033518 | 2/2005 |
| JP | 2007-128143 | 5/2007 |
| JP | 2007-233736 | 9/2007 |
| JP | 2008-136789 | 6/2008 |
| WO | WO 2006/030742 | 3/2006 |
| WO | WO2006/040901 | 4/2006 |
| WO | WO 2008/069158 | 6/2008 |

OTHER PUBLICATIONS

Petzold, Jan, et al. "Next location prediction within a smart office building." Cognitive Science Research Paper—University of Sussex CSRP 577 (2005): 69.*

Bruce, Allison, and Geoffrey Gordon. "Better motion prediction for people-tracking." Proc. of the Int. Conf. on Robotics & Automation (ICRA), Barcelona, Spain. 2004.*

Japanese Office Action mailed Jan. 22, 2013.

* cited by examiner

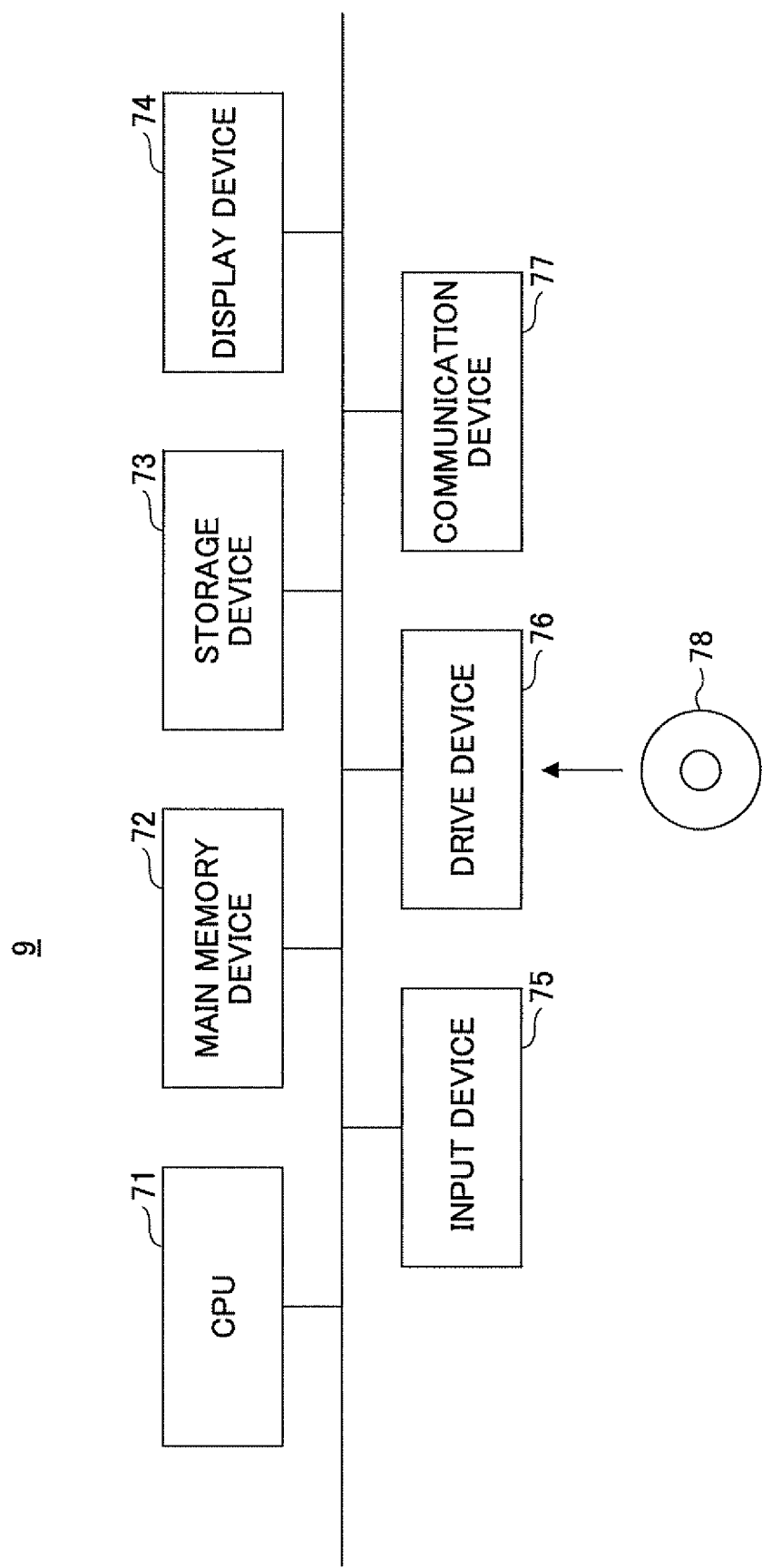

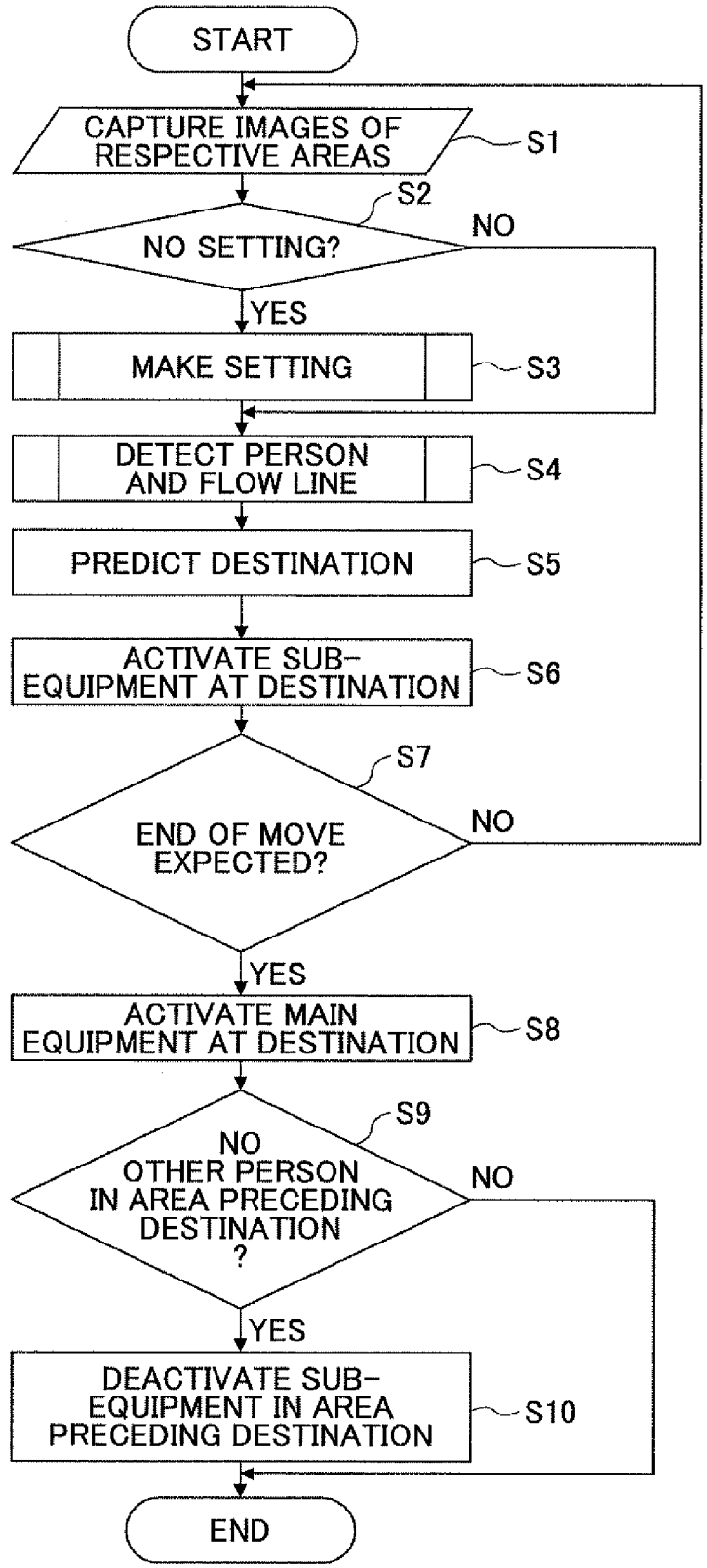

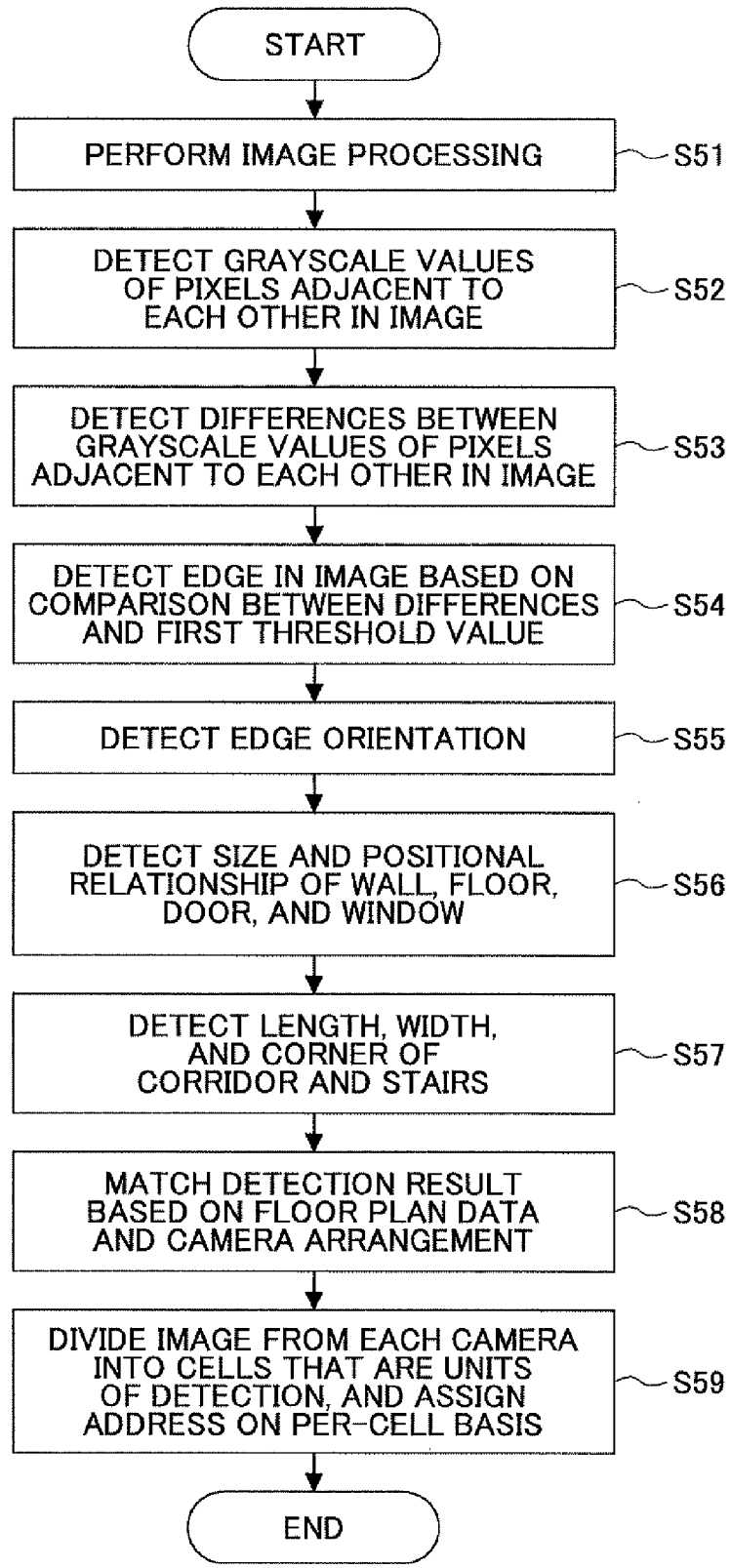

FIG.12

| PERSONAL BELONGING | BEHAVIOR PATTERN | HOUR | DESTINATION | PURPOSE |
|---|---|---|---|---|
| — | MOVE TO WARDROBE AND THEN MOVE TOWARD EXIT | — | BATHROOM | TAKE BATH |
| NEW SOAP | MOVE TOWARD EXIT | — | BATHROOM | REPLENISH |
| LAUNDRY | MOVE TOWARD EXIT | — | BATHROOM | LAUNDRY |
| — | MOVE TOWARD EXIT AND THEN STARE AT RESTROOM | — | RESTROOM | RELIEVE ONESELF |
| TOWEL | MOVE TOWARD EXIT AND THEN STARE AT RESTROOM | — | RESTROOM | REPLACE |
| — | MOVE TOWARD EXIT AND THEN STARE AT BEDROOM | — | BEDROOM | SLEEP |
| CAR KEY | MOVE TOWARD EXIT | — | ENTRANCE | GO OUT |
| GARBAGE BAG | MOVE TOWARD EXIT | — | ENTRANCE | GO OUT |
| — | MOVE TOWARD EXIT | 20:00–21:00 | BATHROOM | TAKE BATH |
| — | MOVE TOWARD EXIT | 23:00–23:15 | BATHROOM | BRUSH TEETH |
| — | DRAW LETTER T TO CAMERA | — | RESTROOM | RELIEVE ONESELF |
| — | DRAW LETTER B TO CAMERA | — | BATHROOM | TAKE BATH |
| | | | | |

FIG.13

| PERSONAL CLASSIFICATION INFORMATION | BEHAVIOR PATTERN | HOUR | DESTINATION | PURPOSE |
|---|---|---|---|---|
| FATHER | MOVE TO WARDROBE AND THEN MOVE TOWARD EXIT | 20:00-21:00 | BATHROOM | TAKE BATH |
| MOTHER | STEP THROUGH ENTRANCE INTO CORRIDOR | 17:00-18:00 | KITCHEN | COOKING |
| BROTHER | STEP THROUGH ENTRANCE INTO CORRIDOR | 17:00-18:00 | BEDROOM | CHANGE OF CLOTHES |
| SISTER | STEP THROUGH ENTRANCE INTO CORRIDOR | 15:00-17:00 | BEDROOM | CHANGE OF CLOTHES |
|  |  |  |  |  |

FIG.16

| PERSONAL BELONGING | BEHAVIOR PATTERN | HOUR | DESTINATION | PURPOSE |
|---|---|---|---|---|
| — | MOVE TOWARD EXIT AND THEN STARE AT RESTROOM | — | RESTROOM | RELIEVE ONESELF |
| DOCUMENT | MOVE TOWARD EXIT AND THEN STARE AT COPY ROOM | — | COPY ROOM | COPYING |
| — | MOVE TOWARD EXIT AND THEN STARE AT ELEVATOR | — | ELEVATOR | MOVE TO ANOTHER FLOOR |
| | | | | |

FIG.18

| BEHAVIOR PATTERN | DESTINATION | PURPOSE |
|---|---|---|
| GET UP FROM BED | SWITCH PANEL | TURN ON LIGHT |

BUILDING MANAGEMENT APPARATUS

TECHNICAL FIELD

The present invention relates to a building management apparatus that integrates and controls devices and facilities provided in a building such as a house, an office, a research center, a factory, a hospital, or the like.

BACKGROUND ART

As disclosed in Patent Document 1, a building such as a residential house, office, factory, or hospital may be provided with an electric current measuring apparatus that measures electric currents consumed by respective sub-systems into which equipment inclusive of facilities installed in the building are grouped. When electric power calculated from a measured current exceeds a predetermined maximum limit, the power to the equipment belonging to the relevant sub-system may be selectively turned off, thereby achieving energy conservation.

RELATED-ART DOCUMENTS

Patent Document

[Patent Document 1] Japanese Patent Application Publication No. 2007-233736

SUMMARY OF THE INVENTION

Problem to be Solved by Invention

The related-art technology described above simply turns off the power to equipment based on the consumed electric power. This achieves energy saving, but may switch off power against the needs of users staying in the building. Further, this may cause inconvenience to the users or makes the users feel insecure, thereby failing to properly satisfy the needs of the users. In this manner, the related-art technology fails to provide a comfortable environment based on diligent control that achieves laborsaving for users, increases comfort level and convenience, and improves the user's sense of security.

In light of the problems described above, it is an object of the present invention to provide a building management apparatus that can provide a comfortable environment based on diligent control.

Means to Solve the Problem

In order to overcome the problems as noted above, a building management apparatus in a building having a plurality of areas according to the present invention includes a prediction unit to predict a destination of a move of a person, a control unit to control equipment inclusive of main equipment or sub-equipment installed in the building based on the destination of the move, one or more imaging units to capture images of at least one of the plurality of areas, and a human-flow-line detecting unit to detect a person and a flow line of the person from the images captured by the imaging units, wherein the prediction unit predicts the destination of the move of the person based on the flow line.

The main equipment may include a bathroom facility, a restroom facility, a water heater facility, an air-conditioning unit, a household electrical appliance, a communication device, an office machine, and the like situated in at least one of the areas. The main equipment is subjected to operation by the person at the destination of the move.

The sub-equipment may include a lighting unit and an air-conditioning unit, for example. The sub-equipment may preferably be controlled at the destination of the move and/or in the areas along the move for the purpose of improving user convenience and comfort upon the move of the person. The lighting unit and the air-conditioning unit may be included in the main equipment rather than in the sub-equipment in some cases.

For the building management apparatus, the plurality of areas correspond to rooms, a corridor connecting between the rooms, and/or stairs, for example. The rooms may include a living room, a bedroom, a kitchen, a bathroom, a restroom, an entrance, etc., in the case of the building being a residential house, and may include an office room, a copy room, a conference room, an automatic vending machine space, a smoking room, an office kitchen, etc., in the case of the building being an office.

With this arrangement, the prediction unit can predict the destination of the move of the person based on the images captured by the imaging units as described below.

In the above-noted building management apparatus, the prediction unit predicts the destination of the move of the person based on a speed or acceleration of the flow line.

In this case, it suffices for the imaging units to have a relatively low resolution that still allows the person and the flow line of the person in the area to be detected through an edge detecting unit, which will be described later. With this arrangement, the imaging units can be implemented at lower cost, and, also, such an implementation is preferable from the viewpoint of privacy protection.

Alternatively, as an embodiment of the prediction unit in the building management apparatus, a line-of-sight detecting unit may be provided to detect the person's line of sight from the images captured by the imaging units, wherein the prediction unit predicts the destination of the move of the person based on the line of sight. In this case, the imaging units may be required to have a relatively high resolution that allows the person's line of sight in the area, i.e., the orientation of the face, to be detected.

Further, as an embodiment of the prediction unit in the building management apparatus, a personal-belonging detecting unit may be provided to detect the person's personal belonging from the images captured by the imaging units, wherein the prediction unit predicts the destination of the move of the person and the purpose of the move based on the personal belonging.

In this case, also, the imaging units may be required to have a relatively high resolution that allows the personal belonging in the area to be detected. With this arrangement, the purpose of the move can be detected in addition to the destination of the move. More diligent control as described in the following can thus be attained.

Alternatively, as an embodiment of the prediction unit in the building management apparatus, a behavior-pattern detecting unit may be provided to detect the person's behavior pattern based on any one or a combination of the images captured by the imaging units, the flow line, the line of sight, and the personal belonging, wherein the prediction unit predicts the destination of the move of the person and the purpose of the move based on the behavior pattern.

In this case, also, the imaging units may be required to have a relatively high resolution that allows the person's behavior pattern in the area to be detected. With this arrangement, the purpose of the move can be detected in addition to the destination of the move. More diligent control as described in the following can thus be attained.

Further, prediction based on the flow line, prediction based on the line of sight, prediction based on the personal belonging, and prediction based on the behavior pattern may be implemented in proper combination.

In the above-noted building management apparatus, a memory unit is preferably provided to store predetermined relationships between at least one of the personal belonging and the behavior pattern and a set of the destination of the move and the purpose of the move, wherein the prediction unit preferably predicts the destination of the move of the person and the purpose of the move based on at least one of the personal belonging and the behavior pattern and the relationships stored in the memory unit.

The person may move from a sofa to a wardrobe, and may take out a towel and extra clothes from the wardrobe to keep them with him/her. In this case, prediction that the destination of the move is a bathroom and that the purpose of the move is to take a bath may be made by the prediction unit more easily and promptly. Alternatively, the person may be carrying a new soap in a plastic shopping bag in the area. In this case, prediction that the destination of the move is a bathroom and that the purpose of the move is to replenish the soap may be made by the prediction unit more easily and promptly.

In order to implement the following predictions, the building management apparatus preferably includes a plurality of imaging units, which are the above-noted imaging units, operable to capture images of the plurality of areas, a destination-of-move detecting unit to detect the destination of the move to which the person has actually moved based on the images or the flow line; a purpose-of-move detecting unit to detect the purpose of the move of the person based on whether an operation is performed with respect to the equipment situated in the destination of the move to which the person has actually moved, and a generation unit to generate an additional relationship that links the behavior pattern detected by the behavior-pattern detecting unit to the destination of the move and the purpose of the move, wherein the memory unit preferably stores the additional relationship.

A relationship may newly occur in addition to the predetermined relationships between at least one of the personal belonging and the behavior pattern and a set of the destination of the move and the purpose of the move. Even in this case, data indicative of the new relationship different from the predetermined relationships is created by the generation unit as the additional relationship, which is then stored in the memory unit for accumulation in an additional database.

With this arrangement, the building management apparatus is given a learning function to adapt prediction by the prediction unit in conformity to the person's actual behavior patterns in the building, thereby further improving convenience and comfort.

In the above-noted building management apparatus, the generation unit preferably generates the additional relationship by linking together the behavior pattern, the destination of the move and the purpose of the move, and accompanying information.

Further, a check unit is preferably provided to identify a room to which the person is assigned based on personal classification information and the person's behavior pattern, wherein the accompanying information includes at least one of an hour, a day, a temperature, a humidity, weather, personal classification information, and a room to which the person belongs.

With this arrangement, the hour, for example, of the accompanying information may be linked to the behavior pattern, the destination of the move, and the purpose of the move to create the additional relationship. The person may take a bath regularly at a predetermined hour. In this case, the person may still move to a wardrobe in the assigned room to take out a towel and extra clothes, and the destination of the move may still be a bathroom, but the purpose of the move could be just to transfer these items rather than to take a bath. Such diligent prediction may be made to accomplish diligent control based on such prediction.

Further, in the case of the building being a residential house, for example, the person may be limited to a family member. In this case, which one of the family, e.g., a father, a mother, a brother, and a sister, is assigned to which one of the rooms corresponding to the areas can be identified and learned without an advance setting.

Further, in the above-noted building management apparatus, the prediction unit predicts the destination of the move of the person and the purpose of the move based on the behavior pattern detected by the behavior-pattern detecting unit, the relationships, and the additional relationship.

With this arrangement, the prediction unit can predict the destination of the move of the person and the purpose of the move based on the newly created additional relationship in addition to the predetermined relationships.

In the above-noted building management apparatus, the prediction unit preferably terminates a prediction based on the relationships and the additional relationship upon detecting, among behaviors included in the behavior pattern detected by the behavior-pattern detecting unit, a behavior that does not match any one of the behaviors included in the relationships or the additional relationship.

The detected behavior pattern may include a behavior that is not regular, i.e., a behavior that is different from a usual behavior. In such a case, the prediction unit terminates a prediction based on the relationships and the additional relationship, and, then, predicts the destination of the move of the person and the purpose of the move by use of another prediction scheme. In this manner, flexibility is increased by making the prediction process adaptable to sudden changes in various circumstances.

Further, in the above-noted building management apparatus, the memory unit preferably stores a behavior that does not match any one of the behaviors included in the relationships or the additional relationship.

With this arrangement, a function may be provided such that the detected behavior failing to match the prediction based on the behavior pattern or the like is recorded in a history of anomaly cases based on the recognition that this behavior constitutes anomaly (i.e., unusual state). Such a circumstance occurs, for example, in a case where the prediction unit predicts based on behavior patterns that the destination of a person walking in the corridor is the bathroom, but the person goes straight to the bedroom and falls asleep immediately. Alternatively, such a circumstance may occur in a case where the prediction unit predicts that the destination of a person walking in the corridor is the living room this time because this person has just gone to the restroom, but the person goes to the restroom again (i.e., the frequency of using the restroom has been high within recent days). Further, such a circumstance may occur in a case where it is about the time for a person to be out of the bathroom (or the restroom), but the person does not come out (which raises a question of whether the person is laying on the floor unconscious in the bathroom or restroom).

In this manner, events of small anomalies observed in everyday life are recorded and checked at constant intervals, thereby helping to preempt a catastrophic anomaly. For example, this function may be useful in order to detect a warning of disease or in order to avoid extremely disorderly life patterns.

In the above-noted building management apparatus, the control unit may select and control the main equipment that matches the purpose of the move among the main equipment situated at the destination of the move of the person predicted by the prediction unit.

In this case, the control unit preferably places the main equipment situated at the destination of the move in a standby state.

With this arrangement, the main equipment that matches the purpose of the move among the main equipment situated at the predicted destination of the move can be selected and controlled.

Prediction may indicate, for example, that the destination of the move of the person is the restroom, and that the purpose of the move is to relieve oneself. In such a case, the restroom facility may be shifted from a sleep state to a standby state. When the person just drops by the restroom to lock up, on the other hand, shifting the restroom facility to a standby state can be avoided. With this arrangement, energy saving and reduction in electric power consumption can be facilitated.

Further, the standby state may involve performing preheating control.

The main equipment in this case may be the bathroom facility or the water heating facility. The control unit initiates a transition from the sleep state to the standby state to perform the preheating control, thereby increasing the temperature of water in advance. The main equipment may be the restroom facility. In this case, the control unit initiates a transition from the sleep state to the standby state to perform the preheating control, thereby increasing the temperature of the lavatory seat in advance.

In the building management apparatus described above, the structures of the rooms, corridor, and stairs in the building as well as the shapes, sizes, and positions of items inclusive of tables, chairs, sofas, the main equipment, and the sub-equipment may need to be specified in advance as setting data. The setting may be made by using images captured by the imaging units, or may be made by using data indicative of the design of the building. These may be combined together.

Alternatively, a setting unit may be provided to make a setting by extracting the structures of the plurality of areas inclusive of the rooms, corridor, and/or stairs, the shapes and sizes of items situated in the plurality of areas, and the positional relationships between these items.

Alternatively, in the building management apparatus, a setting unit may be provided to make a setting based on the data indicative of the design of the building by extracting the structures of the plurality of areas inclusive of the rooms, corridor, and/or stairs, the shapes and sizes of items situated in the plurality of areas, and the positional relationships between these items.

In the building management apparatus, the control unit may control the main equipment based on the destination of the move and the purpose of the move predicted by the prediction unit as follows.

Namely, in the building management apparatus, the control unit selects and controls the main equipment situated at the destination of the move of the person predicted by the prediction unit.

With this arrangement, the main equipment situated at the predicted destination of the move can be selectively controlled. In the case of the destination of the move of the person being the restroom, the restroom facility may be shifted from a sleep state to a standby state.

In addition to the control of the main equipment as described above, the control unit in the building management apparatus may control the sub-equipment based on the destination of the move predicted by the prediction unit as follows.

As a preparation step for achieving such control, in the above-noted building management apparatus, the destination of the move includes both an intermediate destination and a final destination, and the sub-equipment is situated in respective ones of the plurality of areas in the building, wherein the control unit preferably selects and controls the sub-equipment based on the destination of the move of the person predicted by the prediction unit.

In prediction using the flow line and the line of sight, the intermediate destination may be predicted to be the corridor at the time the person is about to move to the exit of the living room. When the person steps out into the corridor and stares at the restroom that is the destination, the final destination may be predicted to be the restroom.

In prediction using the personal belonging and the behavior pattern, the purpose of the move may be predicted to be the relieving of oneself. In this case, the intermediate destination may be predicted to be the corridor, and the final destination may be predicted to be the restroom.

With this arrangement, the sub-equipment corresponding to the intermediate destination situated halfway along the path of the move may be controlled in addition to the sub-equipment situated at the final destination of the person's move.

More specifically, in the above-noted building management apparatus, the prediction unit preferably predicts the destination of the move, and, then, the control unit activates the sub-equipment corresponding to the areas to which the destinations belong.

With this arrangement, the lighting units or the air-conditioning units are activated, as soon as the destination of the move of the person is predicted, ahead of the time the person reaches the destination of the move, thereby providing convenience, comfort, and laborsaving for the person.

The person may move from the living room to the corridor, for example. At the time the person moves to the corridor, the lighting units or the air-conditioning units are already running. This eliminates the time in which the person feels trouble or inconvenience.

Further, the person is given a sense of security as if the person is watched over in the building. Moreover, the fact that the person is staying in the building is clearly visible from outside the building. This also provides the person with reassurance in terms of security.

Further, in the above-noted building management apparatus, the human-flow-line detecting unit detects that the person has reached an area to which the intermediate destination belongs, and, then, the control unit preferably deactivates the sub-equipment corresponding to an area through which the person passed before reaching the area to which the intermediate destination.

With this arrangement, the sub-equipment situated in the living room may be stopped at the time the person moves from the living room to the corridor thereby to eliminate the need for activated sub-equipment. In this manner, energy saving and reduction in electric power can be accomplished without causing discomfort or unpleasant feeling to the person.

Further, in the above-noted building management apparatus, the human-flow-line detecting unit does not detect, based on the images, any people staying in the area through which the person passed before reaching the area to which the intermediate destination belongs, and, then, the control unit preferably deactivates the sub-equipment.

With this arrangement, the sub-equipment may continue running if a person other than the person on the move is present in the preceding area. In this manner, energy saving and reduction in electric power can be accomplished without causing discomfort or unpleasant feeling to other people different from the person on the move.

Alternatively, the human-flow-line detecting unit in the building management apparatus may count, based on the images, a number of people staying in the area through which the person passed before reaching the area to which the intermediate destination belongs. The control unit may deactivate the sub-equipment in response to the number being equal to zero.

With this arrangement, also, the sub-equipment may continue running if a person other than the person on the move is present in the preceding area. In this manner, energy saving and reduction in electric power can be accomplished without causing discomfort or unpleasant feeling to other people different from the person on the move.

In addition, the human-flow-line detecting unit in the building management apparatus may detect that the person has reached the area to which the final destination belongs. In this case, the control unit may preferably deactivate the sub-equipment corresponding to the area through which the person passed before reaching the area to which the final destination belongs.

With this arrangement, the sub-equipment situated in the corridor may be stopped at the time the person moves from the living room to the corridor and then to the restroom thereby to eliminate the need for activated sub-equipment. In this manner, energy saving and reduction in electric power can be accomplished without causing discomfort or unpleasant feeling to the person.

Alternatively, the human-flow-line detecting unit in the building management apparatus may not detect, based on the images, any other person staying in the area through which the person passed before reaching the area to which the final destination belongs. In this case, the control unit may preferably deactivate the sub-equipment.

The person may move from the living room to the corridor and then to the restroom, for example. In this case, the sub-equipment may continue running if a person other than the person on the move is present in the preceding area, i.e., in the corridor. In this manner, energy saving and reduction in electric power can be accomplished without causing discomfort or unpleasant feeling to other people different from the person on the move.

Alternatively, the human-flow-line detecting unit in the building management apparatus may count, based on the images, a number of people staying in the area through which the person passed before reaching the area to which the final destination belongs. The control unit may deactivate the sub-equipment in response to the number being equal to zero.

The person may move from the living room to the corridor and then to the restroom, for example. In this case, the sub-equipment may continue running if a person other than the person on the move is present in the preceding area, i.e., in the corridor. In this manner, energy saving and reduction in electric power can be accomplished without causing discomfort or unpleasant feeling to other people different from the person on the move.

Advantage of the Invention

The present invention provides a building management system that can provide a comfortable environment based on diligent control.

BRIEF DESCRIPTION OF DRAWINGS

FIG. 2 is a block diagram of the embodiment of the building management apparatus according to the present invention.

FIG. 3 is a flowchart illustrating the control performed by the embodiment of the building management apparatus according to the present invention.

FIG. 4 is a flowchart illustrating the control performed by the embodiment of the building management apparatus according to the present invention.

FIG. 12 is a map used in the control performed by the embodiment of the building management system according to the present invention.

FIG. 13 is an additional map used in the control performed by the embodiment of the building management system according to the present invention.

FIG. 16 is a map used in the control performed by the embodiment of the building management system according to the present invention.

FIG. 18 is a map used in the control performed by the embodiment of the building management system according to the present invention.

MODE FOR CARRYING OUT THE INVENTION

In the following, preferred embodiments for carrying out the present invention will be described by referring to the accompanying drawings.

Embodiment 1

Figure 1:
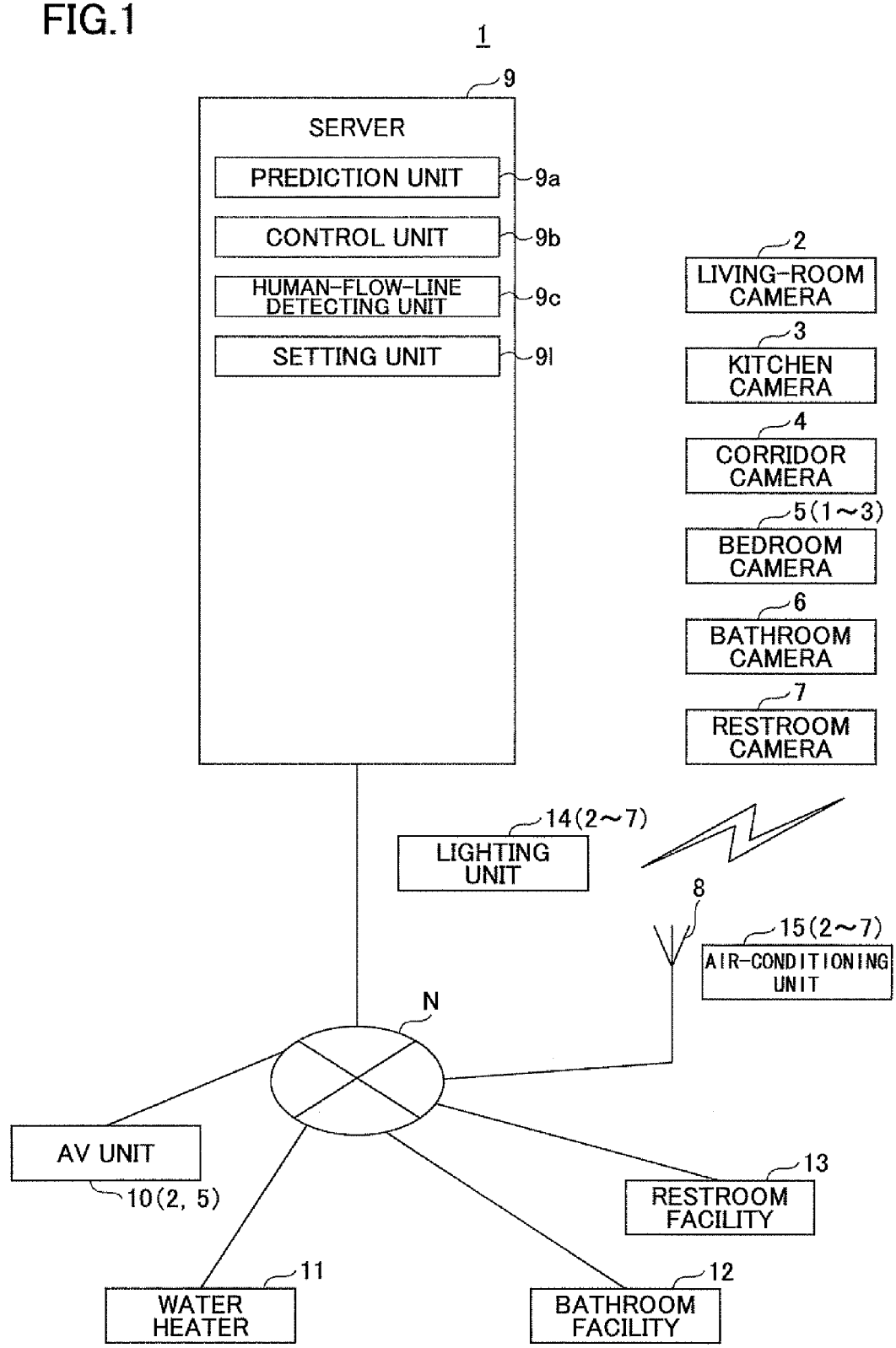
FIG. 1 is a block diagram of an embodiment of a building management apparatus according to the present invention.

FIG. 1 is an illustrative drawing of an embodiment of a building management apparatus according to the present invention. In this example, a building has a plurality of areas. These areas may include a living room, a kitchen, a corridor, a bedroom, a bathroom, and a restroom.

As illustrated in FIG. 1, a building management apparatus 1 includes a living-room camera 2 provided in the living room of a residential house serving as the building, a kitchen camera 3 provided in the kitchen, a corridor camera 4 provided in the corridor, bedroom cameras 5(1-3: for three bedrooms in this example) provided in the bedrooms. The building management apparatus 1 further includes a bathroom camera 6 provided in the bathroom, a restroom camera 7 provided in the restroom, an antenna 8 and a server 9 provided in the living room, an AV unit 10, a water heater 11 provided in the kitchen, a bathroom facility 12 provided in the bathroom, a restroom facility 13 provided in the restroom, and air-conditioning units 14(2-7) and lighting units 15(2-7) provided in the respective rooms and corridor.

Symbol 2 shown in parentheses indicates that the item belongs to the living room. Symbol 3 indicates that the item belongs to the kitchen. Symbol 4 indicates that the item belongs to the corridor. Symbol 5 indicates that the item belongs to a bedroom. Symbol 6 indicates that the item belongs to the bathroom. Symbol 7 indicates that the item belongs to the restroom.

The living-room camera 2, the kitchen camera 3, the corridor camera 4, the bedroom cameras 5(1-3), the bathroom camera 6, the restroom camera 7, the server 9, the AV unit 10, the water heater 11, the bathroom facility 12, the restroom facility 13, the lighting units 14, and the air-conditioning units 15 are connected together through an indoor ubiquitous network N, with or without the antenna 8 intervening therebetween.

The indoor ubiquitous network N may be a wired network such as a public switched telephone network (PSTN), an integrated services digital network (ISDN), or an optical fiber network, or may be a wireless network such as a mobile phone network, a PHS (personal handy-phone system) network, a wireless LAN network, a WiMAX (Worldwide Interoperability for Microwave Access) network, a satellite telephone, a beacon, etc.

The living-room camera 2, the kitchen camera 3, the corridor camera 4, the bedroom cameras 5(1-3), the bathroom camera 6, and the restroom camera 7 may be CCD cameras or CMOS cameras, for example. These cameras may be arranged at one of the four corner positions of the ceiling from which an entire view of a corresponding room or corridor can be taken.

The cameras 2-7 serve as a plurality of imaging units, and capture an image of a corresponding room or corridor with a relatively low resolution that still allows a person and the flow line of the person in the area to be detected by an edge detection unit or the like, which will be described later. Information inclusive of the captured images is transmitted to the server 9 through the indoor ubiquitous network N.

The AV unit 10 is provided in the living room or bedrooms. The AV unit 10 may be comprised of a liquid-crystal television and a DVD recorder. The AV unit 10 is activated or deactivated under the control of the server 9 or through an operation performed by a person staying in the residential house. The AV unit 10 provides video, audio, and music for viewers and listeners.

The water heater 11 is provided in the kitchen. The water heater 11 supplies hot water for use in cooking, dish washing, or the like. The water heater 11 is activated or deactivated under the control of the server 9 or through an operation performed by a person staying in the residential house.

The bathroom facility 12 is provided in the bathroom, and is activated or deactivated under the control of the server 9 or through an operation performed by a person staying in the residential house. The functions of the bathroom facility 12 include heating tap water to supply hot water for use as shower water or as bathwater in the bathtub of the bathroom, supplying bathwater to the bathtub, and further heating the bathwater.

The restroom facility 13 is provided in the restroom, and is activated or deactivated under the control of the server 9 or through an operation performed by a person staying in the residential house. The functions of the restroom facility 13 include heating a lavatory seat in the restroom.

The AV unit 10, the water heater 11, the bathroom facility 12, and the restroom facility 13 described above each constitute main equipment.

The lighting units 14(2-7) provide lighting for a corresponding room or corridor, and constitute sub-equipment. The air-conditioning units 15(2-7) control temperature and humidity in a corresponding room or corridor, and constitute sub-equipment.

As illustrated in FIG. 2, the server 9 includes a CPU 71, a main memory device 72, a storage device 73 such as an HDD, a display device 74, an input device 75, a drive device 76, and a communication device 77. As illustrated in FIG. 1, the server 9 serves as a prediction unit 9a, a control unit 9b, a human-flow-line detecting unit 9c, and a setting unit 9l.

The communication device 77 is provided in the living room of the residential house, for example. The communication device 77 collects information regarding images of respective areas captured by the living-room camera 2, the kitchen camera 3, the corridor camera 4, the bedroom cameras 5, the bathroom camera 6, and the restroom camera 7.

The CPU 71 reads programs such as OS and application programs from the storage device 73, and executes them to provide various functions. The CPU 71 also controls processes performed by the server 9 in an integrated manner. The main memory device 72 is comprised of a RAM, and serves as a work area for temporarily storing the OS, programs, and data. The storage device 73 is a nonvolatile memory such as an HDD or a flash memory. The storage device 73 stores OS files, programs files, driver files, and the like.

In response to instruction by the CPU 71, the storage device 73 stores, together with a date-and-time indication, information regarding images transmitted from the above-noted cameras 2 to 7. The storage device 73 also stores information about the design of the building, i.e., floor plan data, which is prepared in advance.

The display device 74 displays screen information on a multi-information display as instructed by programs. The display device 74 may provide a GUI (Graphical User Interface) screen, for example, thereby displaying various windows and data required for operations on a display screen.

The input device 75 is comprised of a touch panel which is part of the multi-information display, and serves to receive various operation instructions from people inside the residential house. The drive device 76 is configured to allow a memory medium 78 inserted thereinto. The drive device 76 reads data stored in the memory medium 78 for transmission to the main memory device 72 or the like.

The setting unit 9*l* detects edges, edge directions, the sizes and positional relationships of walls, floors, doors, and windows in each area, and the length, width, and corners of corridor stairs. The setting unit 9*l* compares the detected data with the arrangement of the cameras 2 to 7 and the information about the design of the residential house, i.e., the floor plan data which is provided in advance, and, then, divides the images from the cameras 2 to 7 into cells which serve as units of detection. The setting unit 9*l* assigns an address on a per-cell basis, thereby performing a setting process.

The human-flow-line detecting unit 9*c* detects a differential by comparing each given image with an image preceding the given image by a predetermined interval of time based on the information about images captured by the cameras 2 to 7. The setting unit 9*l* determines whether a moving object exists based on the differential, and also determines whether the moving object is a human, thereby detecting the direction, speed, and acceleration of a human flow line.

The prediction unit 9*a* predicts the destination of a person based on the flow line detected by the human-flow-line detecting unit 9*c*. The prediction unit 9*a* activates sub-equipment situated at the destination through the control of the control unit 9*b*. When the completion of the movement is predicted, the prediction unit 9*a* activates main equipment situated at the destination. The prediction unit 9*a* determines whether another person is present in an area preceding the destination directly from the data detected by the human-flow-line detecting unit 9*c*, or by counting the number of people present in the area preceding the destination based on the data detected by the human-flow-line detecting unit 9*c*. The prediction unit 9*a* deactivates sub-equipment situated at the position preceding the destination through the control of the control unit 9*b* when another person is not present in the preceding area.

In the following, the control performed by the building management apparatus 1 described above will be described by use of a flowchart. FIG. 3 is a flowchart illustrating the control performed by the building management apparatus 1 according to the present invention. FIG. 4 illustrates a subroutine of step S3 appearing in the flowchart of the control performed by the building management apparatus 1 of the present invention illustrated in FIG. 3. FIGS. 5A through 5D are illustrative drawings showing the processes of the subroutine illustrated in FIG. 4.

Figure 6:
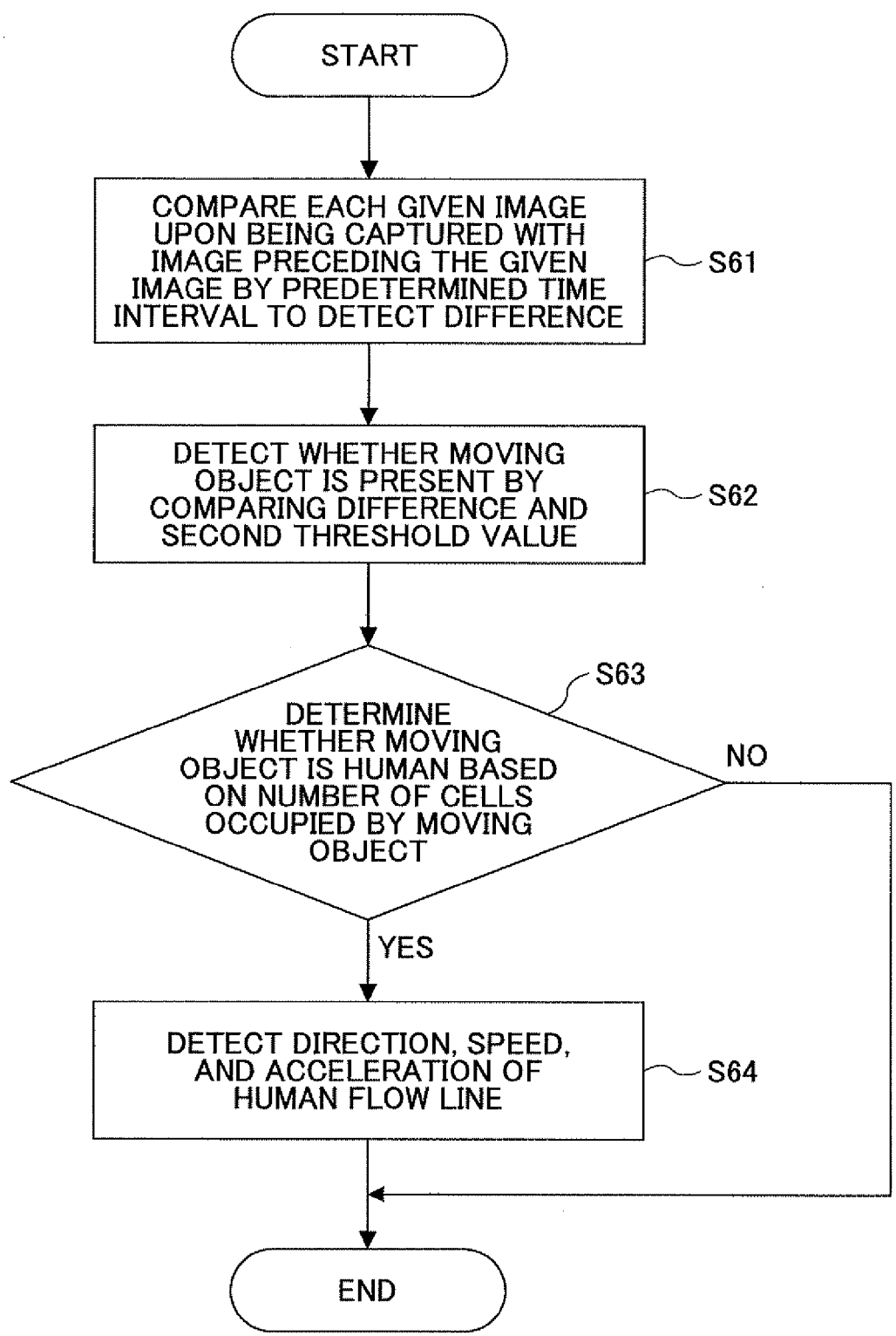
FIG. 6 is a flowchart illustrating the control performed by the embodiment of the building management apparatus according to the present invention.

FIG. 6 illustrates a subroutine of step S4 appearing in the flowchart of the control performed by the building management apparatus 1 of the present invention illustrated in FIG. 3. FIGS. 7A through 7D are illustrative drawings showing the processes of the subroutine illustrated in FIG. 6.

In S1, the cameras 2 to 7 described above capture images of respective areas. In S2, the setting unit 9*l* of the server 9 checks whether no setting has been made, i.e., whether the setting process described above has come to an end. In the case of affirmation, the procedure proceeds to S3 in which a setting process is performed.

Figure 5A:
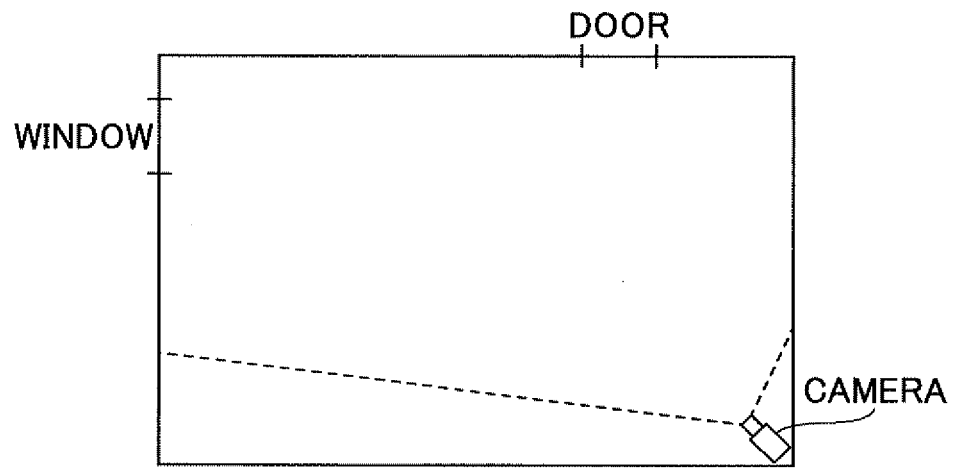
FIG. 5A is an illustrative drawing illustrating processes performed by the embodiment of the building management apparatus according to the present invention.

In the following, a detailed description will be given of the processes of S3 illustrated in FIG. 3 by referring to FIG. 4 and FIGS. 5A through 5D. As illustrated in FIG. 4, in S51, the setting unit 9*l* of the server 9 acquires information regarding images of respective areas captured by the cameras 2 to 7 as illustrated in FIG. 5A, and performs image processing. In S52, the setting unit 9*l* detects the grayscale values of mutually adjacent pixels in each image. In S53, the setting unit 9*l* detects differences between the grayscale values of mutually adjacent pixels in each image. FIG. 5A illustrates a floor plan of the living room, for example.

Figure 5B:
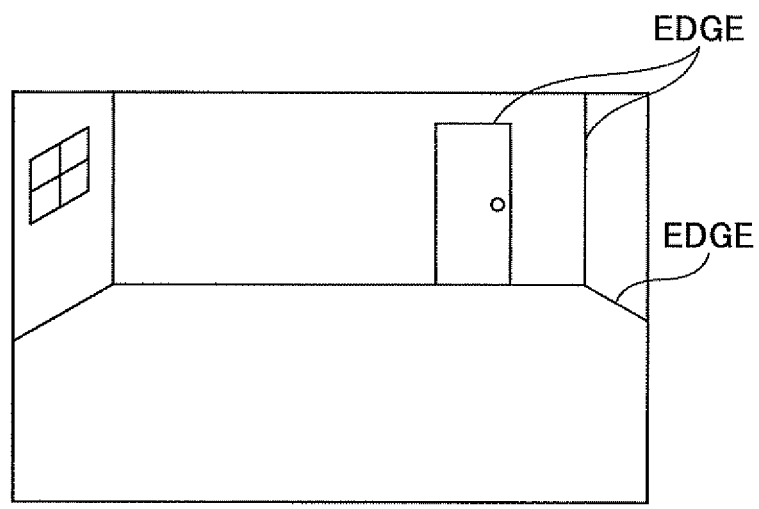
FIG. 5B is an illustrative drawing illustrating processes performed by the embodiment of the building management apparatus according to the present invention.
Figure 5C:
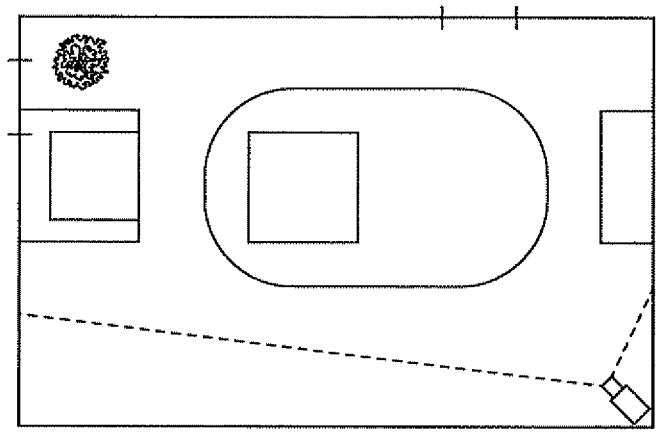
FIG. 5C is an illustrative drawing illustrating processes performed by the embodiment of the building management apparatus according to the present invention.

In S54, the setting unit 9*l* detects edges in each image as illustrated in FIG. 52 based on comparison between these differences and a first preset threshold value. In S55, the human-flow-line detecting unit 9*c* detects edge directions. FIG. 5B illustrates an image captured by the living-room camera 2, for example. In S56, the setting unit 9*l* detects the sizes of walls, floors, doors, and windows in each area as illustrated in FIG. 5B, and also detects the sizes and positional relationships of furniture and fixtures such as a sofa, a table, and the AV unit 10 placed in the furnished living room such as the one illustrated in FIG. 5C. In S57, the setting unit 9*l* detects the length, width, and corners of a corridor or stairs among the relevant areas.

Figure 5D:
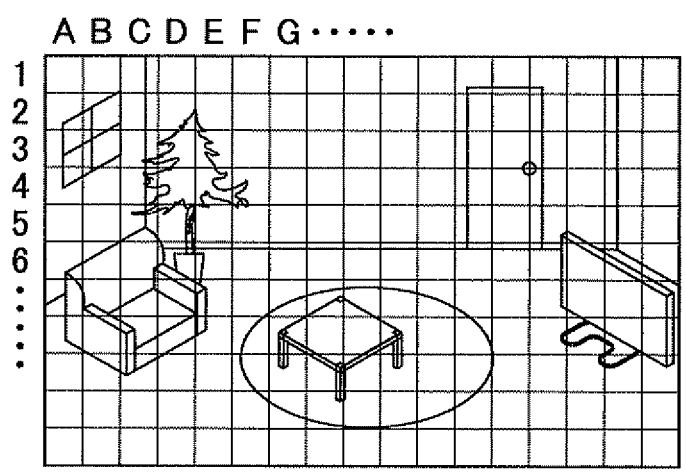
FIG. 5D is an illustrative drawing illustrating processes performed by the embodiment of the building management apparatus according to the present invention.

In S58, the setting unit 9*l* compares the data detected from the images of the cameras 2 to 7 with the arrangement of the cameras 2 to 7 in the respective areas and the floor plan data stored in the storage device 73. In S59, the setting unit 9*l* divides the images of the cameras 2 to 7 into cells, which are units of detection corresponding to divided images as illustrated in FIG. 5D, for example. The setting unit 9*l* assigns an address on a per-cell basis, thereby completing the setting process.

In S4 illustrated in FIG. 3, the human-flow-line detecting unit 9*c* of the server 9 detects people and the flow lines of the people in the images of respective areas. In the following, a detailed description will be given of the processes of S4 illustrated in FIG. 3 by referring to FIG. 6 and FIGS. 7A through 7D. As illustrated in FIG. 6, in S61, the human-flow-line detecting unit 9*c* compares each given image upon being captured with an image preceding the given image by a predetermined time interval, thereby detecting differences.

Figure 7A:
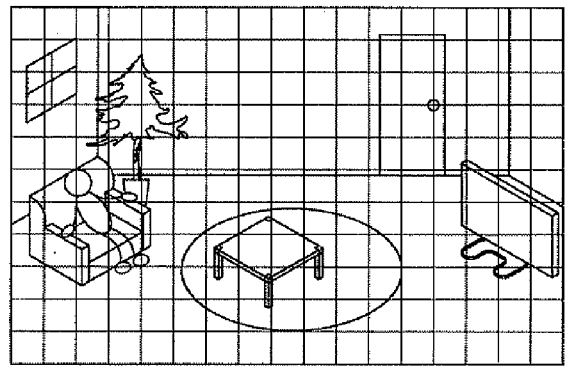
FIG. 7A is an illustrative drawing illustrating processes performed by the embodiment of the building management apparatus according to the present invention.
Figure 7B:
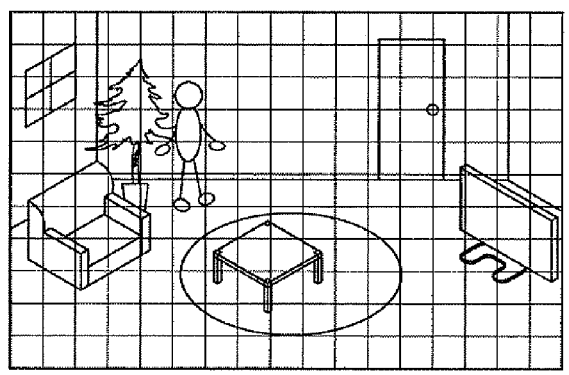
FIG. 7B is an illustrative drawing illustrating processes performed by the embodiment of the building management apparatus according to the present invention.
Figure 7C:
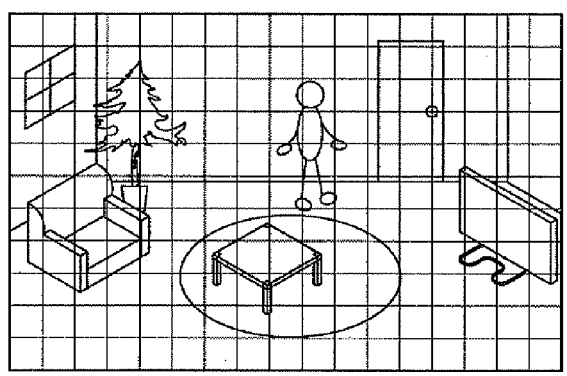
FIG. 7C is an illustrative drawing illustrating processes performed by the embodiment of the building management apparatus according to the present invention.
Figure 7D:
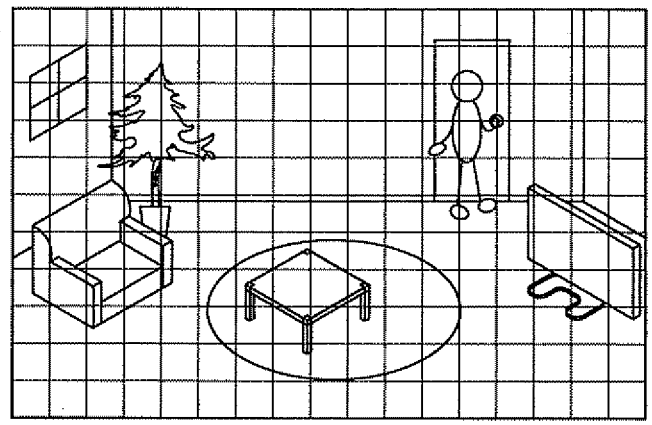
FIG. 7D is an illustrative drawing illustrating processes performed by the embodiment of the building management apparatus according to the present invention.

In examples illustrated in FIGS. 7A through 7D, FIG. 7B shows an n-th image in the series of images captured at predetermined time intervals, and FIG. 7A shows an (n−m)-th image, for example. FIG. 7C shows an (n+m)-th image, and FIG. 7D shows an (n+2m)-th image.

Figure 8:
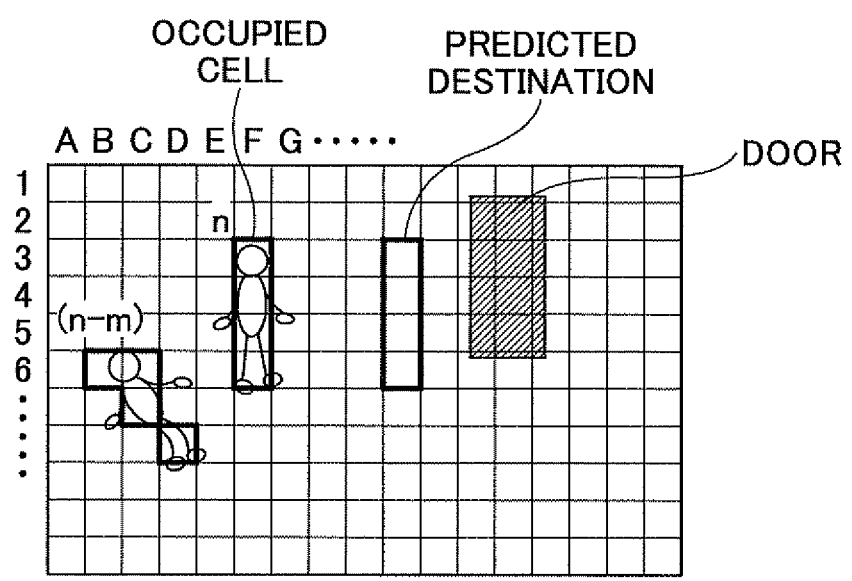
FIG. 8 is an illustrative drawing illustrating processes performed by the embodiment of the building management apparatus according to the present invention.

In these examples, differences between the n-th image and he (n−m)-th image may be detected as illustrated in FIG. 8. Using these differences, the human-flow-line detecting unit 9*c* detects in S62 of FIG. 6 whether a moving object is present in the images based on comparison between these differences and a second preset threshold value. In S63, the human-flow-line detecting unit 9*c* checks whether the moving object is a human based on the number of cells occupied by the moving object. In the case of affirmation, the procedure proceeds to S64, in which the motion direction, speed, and acceleration of human flow lines are detected based on the differences between the cells occupied in the n-th image and the cells occupied in the (n−m)-th image. In the case of negation in S63, the subroutine comes to an end. The procedure then proceeds to S5 of FIG. 3.

In S5 of FIG. 3, the prediction unit 9*a* of the server 9 predicts the destination of the person. In S6, the control unit 9*b* of the server 9 controls and activates some of the sub-equipment situated at the destination, i.e., those of the lighting units 14(2-7) and the air-conditioning units 15(2-7) which are situated at the destination.

Figure 9:
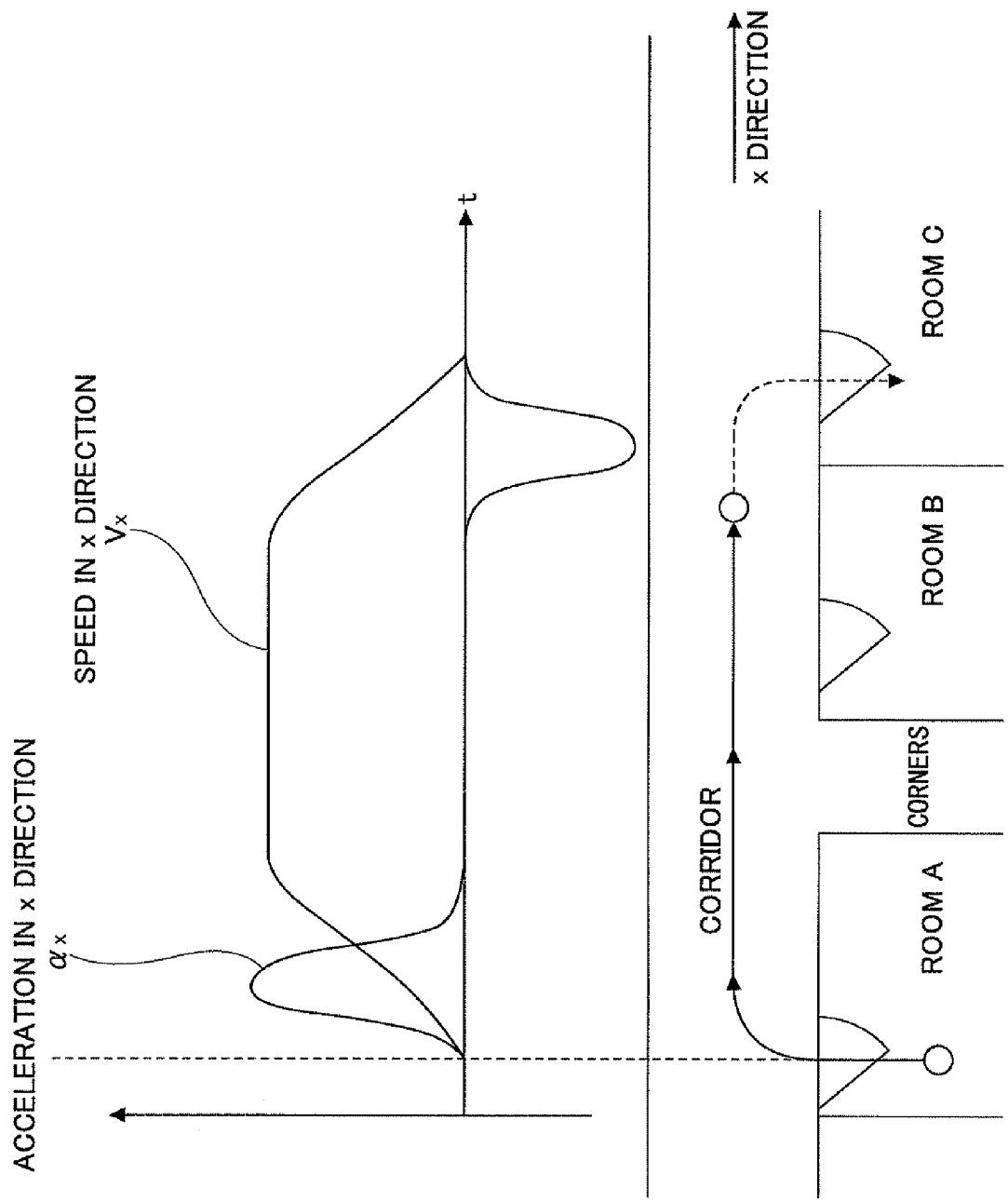
FIG. 9 is an illustrative drawing illustrating processes performed by the embodiment of the building management apparatus according to the present invention.

As illustrated in the lower part of FIG. 9, a person may be about to enter a room C after stepping out of a living room A into the corridor and then passing by corridor corners and a room B. When this happens, the flow line of the person detected in S4 of FIG. 3 may have a speed vx in a direction x corresponding to the longitudinal direction of the corridor and an acceleration αx, which may exhibit temporal changes as illustrated in the upper half of FIG. 9. In this case, the movement of the person is not about to stop during a period in which the acceleration αx is positive and the speed vx is increasing and also during a period in which the speed vx is constant. It is reasonable to assume that the movement of the person is about to stop when the speed vx decreases and the acceleration αx is negative.

The above-noted characteristics are utilized. In S8 of FIG. 3, the prediction unit 9a checks whether the end of movement is expected to happen based on whether a decrease in the speed vx and a negative value in the acceleration αx are observed. In the case of affirmation, the procedure proceeds to S8. In S8, the control unit 9b controls and activates the AV unit 10 situated in a bedroom since this bedroom is the destination room C illustrated in FIG. 9, for example. Alternatively, the control unit 9b performs a preheating control to preheat water in the bathroom facility 12 if the room C is the bathroom. A preheating control to preheat a lavatory seat is performed if the room C is the restroom.

Further, the human-flow-line detecting unit 9c of the server 9 counts the number of people in an area preceding the destination room C, i.e., the corridor in this example, thereby detecting whether other people in addition to the person on the move are present. In S9, the prediction unit 9a determines based on the above-noted detection whether no other person is present in the area preceding the destination. In the case of affirmation, the procedure proceeds to S10. In S10, the control unit 9b deactivates sub-equipment situated at the position preceding the destination. In the case of negation in S9, the control comes to an end.

Figure 10:
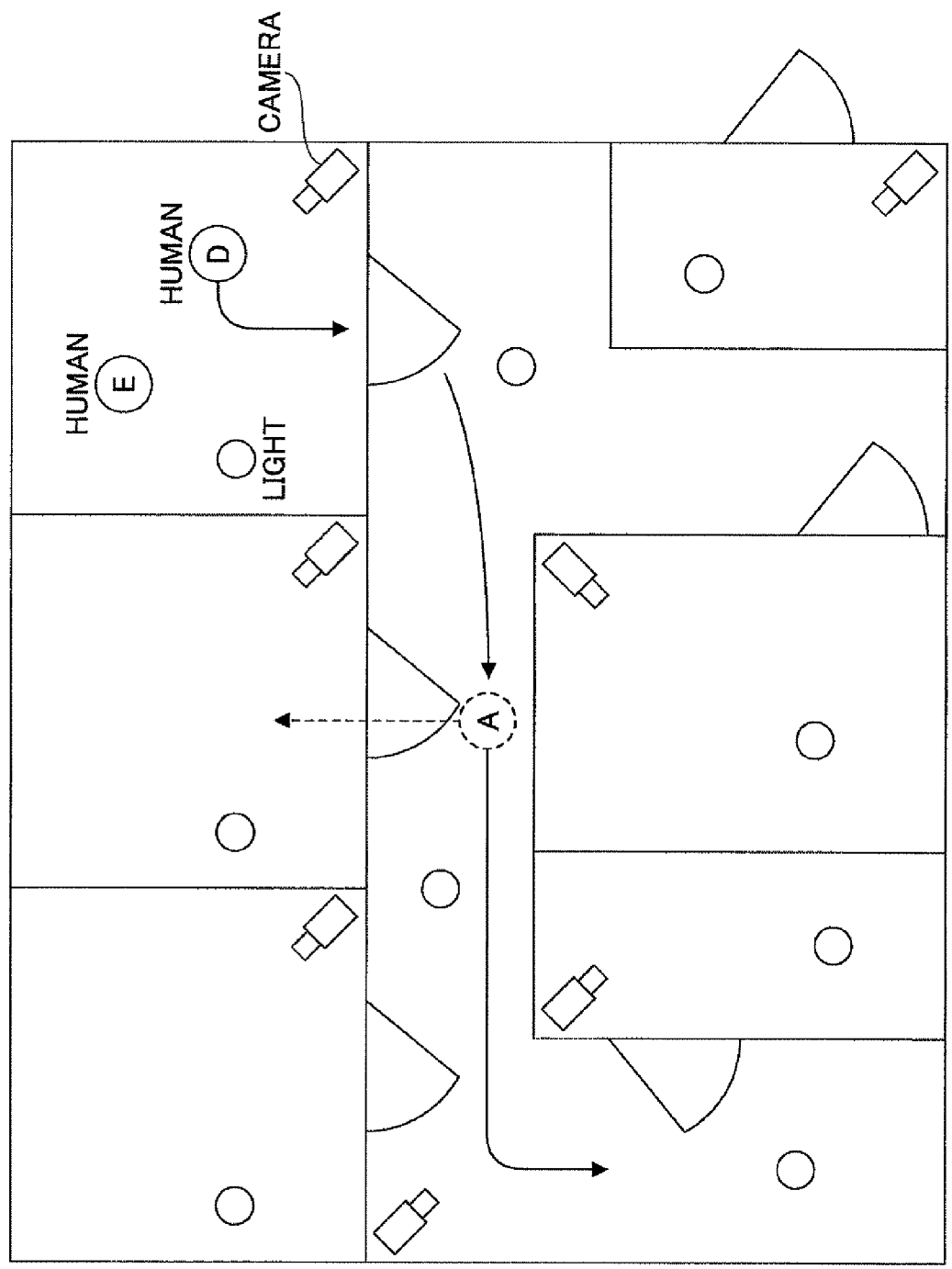
FIG. 10 is an illustrative drawing illustrating processes performed by the embodiment of the building management apparatus according to the present invention.

The floor plan of the building may be as illustrated in FIG. 10, and a person D may approach the door with an intention to step out of the room. In this case, all the lights of the lighting units 14(4) in the corridor are lit (i.e., activated) under the control of the control unit 9b. When the direction of movement according to the flow line of the person D is detected after the person D steps into the corridor, the lights of the lighting units 14(4) that are situated opposite the direction of movement are turned off (i.e., deactivated). Further, all the main equipment belonging to the room that is predicted to be the destination according to the direction of movement is shifted from a sleep state to a standby state, and the lighting units 14 and the air-conditioning units 15 are activated. When the person D passes by the room that is predicted to be the destination in the preceding step, the main equipment of this room is placed in a sleep state again.

The building management apparatus 1 of the first embodiment implemented by the control procedures described above brings about results and advantages as follows. Main equipment and sub-equipment are activated based on the prediction of a destination to which a person goes, whereas main equipment and sub-equipment in the related art are activated or deactivated by use of an infrared sensor or the like after the movement of a person. Accordingly, time in which the control causes inconvenience or harm upon the movement of a person is eliminated as much as possible.

Especially, in the case of the destination being a bathroom or a restroom, water may be preheated, or the lavatory seat may be preheated. Time in which the person suffers inconvenience or harm can be eliminated as much as possible, compared to the case in which preheating performed after the movement of a person results in cold water being supplied for some duration upon using the bathroom or the lavatory seat being cold for some duration upon using the restroom.

Another person may still stay in an area even after the person of interest moves out of the area. In such a case, sub-equipment such as lighting units is allowed to stay in an activated state. This avoids causing inconvenience or harm to others by stopping the sub-equipment after the person moves out.

The person who moves out is not conscious of the stopping of sub-equipment such as the lighting units 14. This provides a more conformable environment.

In addition, the cameras 2 to 7 capture images with a relatively low resolution that still allows a person and the flow line of the person in the area to be detected through an edge detecting unit, which will be described later. This reduces the initial cost of the building management apparatus 1 by allowing the use of inexpensive cameras 2 to 7.

The resolution of the cameras 2 to 7 is relatively low. Reduction in power consumption by the cameras 2 to 7 allows the use of a wireless power supply type that does not need a fixed power supply such a battery and power lines. The applicability of the building management apparatus 1 is also improved. The fact that the captured images have low resolution may also be preferable from the viewpoint of privacy protection.

Moreover, the turning on and off of the lighting units 14 are performed upon the movement of a person. This provides people in the residential house with reassurance that they are watched over. The presence of people in the residential house is indicated to others outside the house, which also adds to a sense of security from the security viewpoint.

In the first embodiment described above, the destination to which a person goes is predicted based on the speed and acceleration of a flow line that is obtained by detecting edges in the images captured by the cameras 2 to 7. In so doing, cameras having higher resolution may be used to also detect the person's line of sight, the person's personal belongings, and the person's behavior patterns. Based on these, more diligent control may be performed by predicting the purpose of move in addition to the destination of the move. In the following, a second embodiment directed to such implementation will be described.

Embodiment 2

Figure 11:
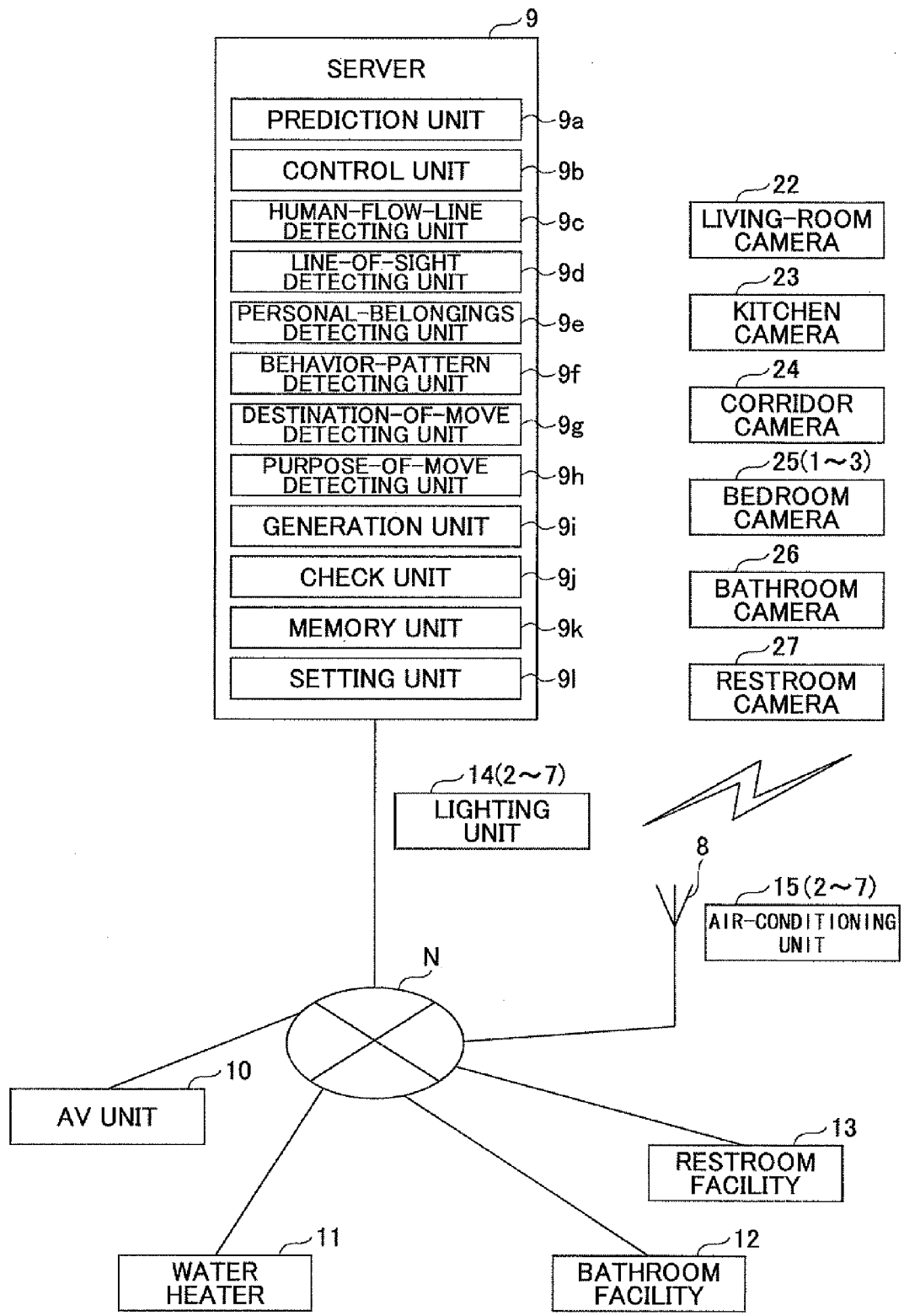
FIG. 11 is a block diagram of an embodiment of a building management apparatus according to the present invention.

FIG. 11 is an illustrative drawing of an embodiment of a building management apparatus according to the present invention. FIG. 12 is a map used in the embodiment of a building management apparatus according to the present invention. FIG. 13 is an additional map used in the embodiment of a building management apparatus according to the present invention. In this example, a building also has a plurality of areas. These areas may include a living room, a kitchen, a corridor, a bedroom, a bathroom, and a restroom.

As illustrated in FIG. 11, a building management apparatus 21 includes a living-room camera 22 provided in the living room of a residential house serving as the building, a kitchen camera 23 provided in the kitchen, a corridor camera 24 provided in the corridor, bedroom cameras 25(1-3: for three bedrooms also in this example) provided in the bedrooms, a bathroom camera 26 provided in the bathroom, and a restroom camera 27 provided in the restroom. The building management apparatus 21 further includes an antenna 8 and a server 9 provided in the living room, an AV unit 10, a water heater 11 provided in the kitchen, a bathroom facility 12 provided in the bathroom, a restroom facility 13 provided in the restroom, and air-conditioning units 14(2-7) and lighting units 15(2-7) provided in the respective rooms and corridor.

The same elements as those illustrated in FIG. 1 are referred to by the same symbols, and a duplicate description will be omitted.

Symbol 2 shown in parentheses also indicates that the item belongs to the living room. Symbol 3 indicates that the item belongs to the kitchen. Symbol 4 indicates that the item belongs to the corridor. Symbol 5 indicates that the item belongs to a bedroom. Symbol 6 indicates that the item belongs to the bathroom. Symbol 7 indicates that the item belongs to the restroom.

The living-room camera 22, the kitchen camera 23, the corridor camera 24, the bedroom cameras 25(1-3), the bathroom camera 26, the restroom camera 27, the server 9, the AV unit 10, the water heater 11, the bathroom facility 12, the restroom facility 13, the lighting units 14, and the air-conditioning units 15 are connected together through an indoor ubiquitous network N similar to that of the first embodiment, with or without the antenna 8 intervening therebetween.

The living-room camera 22, the kitchen camera 23, the corridor camera 24, the bedroom cameras 25(1-3), the bathroom camera 26, and the restroom camera 27 may be CCD cameras or CMOS cameras, for example. These cameras may be arranged at one of the four corner positions of the ceiling from which an entire view of a corresponding room or corridor can be taken.

The cameras 22-7 serve as a plurality of imaging units, and capture an image of a corresponding room or corridor with a relatively high resolution that allows a person's line of sight, personal belongings, and behavior patterns to be detected. Information inclusive of the captured images is transmitted to the server 9 through the indoor ubiquitous network N.

Similar to the one illustrated in FIG. 2, the server 9 includes a CPU 71, a main memory device 72, a storage device 73 such as an HDD, a display device 74, an input device 75, a drive device 76, and a communication device 77. As illustrated in FIG. 11, the server 9 serves as a prediction unit 9a, control unit 9b, human-flow-line detecting unit 9c, a line-of-sight detecting unit 9d, a personal-belonging detecting unit 9e, a behavior-pattern detecting unit 9f, a destination-of-move detecting unit 9g, a purpose-of-move detecting unit 9h, a generation unit 9i, a check unit 9j, a memory unit 9k, and a setting unit 9l.

Similar to the one described in the first embodiment, the human-flow-line detecting unit 9c detects a person based on differences between each given image and a preceding image, thereby detecting the direction, speed, and acceleration of a human flow line. The line-of-sight detecting unit 9d detects a line of sight from the direction of the face of a person appearing in each image. The personal-belonging detecting unit 9e detects personal belongings of a person appearing in each image such as a towel, extra clothes, a car key, or the like based on shape matching or the like. The behavior-pattern detecting unit 9f detects personal behavior patterns based on the images captured by the cameras 22 to 27, a history of flow lines detected by the human-flow-line detecting unit 9c, a line of sight detected by the line-of-sight detecting unit 9d, and personal belongings detected by the personal-belonging detecting unit 9e.

The prediction unit 9a of the server 9 predicts the destination of a person on the move and the purpose of the move based on the behavior patterns detected by the behavior-pattern detecting unit 9f. In this case, the memory unit 9k comprised of the storage device 73 of the server 9 stores a map as illustrated in FIG. 12, which indicates predetermined relationships between at least one of personal belongings and behavior patterns and a set of the destination of move and the purpose of move.

The map illustrated in FIG. 12 is provided only for illustrative purposes. A person may move towards a wardrobe in the living room, and, then, move toward the exit, i.e., the door. In this case, it may be reasonable to assume that the destination of the move is the bathroom and the purpose of the move is to take a bath. This relationship is then added to the map as one of the relationships. Alternatively, a person may have a new soap, and may move toward the exit of the living room. In this case, it may be reasonable to assume that the destination of the move is the bathroom and the purpose of the move is to replenish the soap. This relationship is then added to the map as one of the relationships.

Alternatively, a person may have laundry, and may move towards the exit of the living room or the exit of a bedroom with a balcony. In this case, it may be reasonable to assume that the destination of the move is the bathroom, and the purpose of the move is to do laundry. Alternatively, a person may move towards the exit of the living room, and may then stare at the restroom. In this case, it may be reasonable to assume that the destination of the move is the restroom, and the purpose of the move is to relieve himself or herself. In these cases, these relationships are added to the map.

Alternatively, a person may hold a car key as a personal belonging and move toward the exit of the living room. In this case, it may be reasonable to assume that the destination of the move is the entrance, and the purpose of the move is to go out. Alternatively, a person may move towards the exit of the living room during a period of 23:00 to 23:15. In this case, it may be reasonable to assume that the destination of the move is the bathroom, and the purpose of the move is brushing of teeth. In these cases, these relationships are added to the map.

A person may wish to link a particular signaling behavior to a set of the destination of move and the purpose of move as a message or command to the building management apparatus 1. In such a case, the map may include the relationship indicating that the destination of move is the restroom and the purpose of move is to relieve oneself if the person forms a T-letter shape with hands towards any one of the cameras 22 to 27, for example.

Moreover, the destination-of-move detecting unit 9g of the server 9 detects the destination of the move to which the person actually has moved based on the images captured by the cameras 22 to 27 or based on the flow line that is detected by the human-flow-line detecting unit 9c from these images. The purpose-of-move detecting unit 9h of the server 9 acquires information indicative of the presence or absence of an operation on main equipment or sub-equipment situated in the destination to which the person has actually moved, thereby detecting the purpose of the move based on the acquired information.

The generation unit 9i of the server 9 generates an additional map as illustrated in FIG. 13 that indicates additional relationships linking the behavior patterns detected by the behavior-pattern detecting unit 9f to the actual destination of move detected by the destination-of-move detecting unit 9g and the actual purpose of move detected by the purpose-of-move detecting unit 9h. The memory unit 9k stores the additional map indicative of the additional relationships at proper timing in addition to the map.

In this case, the generation unit 9i of the server 9 generates an additional relationship by linking accompanying information to the behavior pattern detected by the behavior-pattern detecting unit 9f, the destination of the move detected by the destination-of-move detecting unit 9g, and the purpose of the move detected by the purpose-of-move detecting unit 9h. The accompanying information includes an hour, personal classification information (father, mother, brother, sister, etc.), and a room assigned to a person, which includes a bedroom.

The check unit 9j of the server 9 identifies the room to which a person is assigned, based on the personal classification information and the person's behavior patterns detected by the behavior-pattern detecting unit 9f. The personal classification information may be identified based on the number of cells occupied by a person because each person has a different physical size. In order to perform more sophisticated matching, matching may be performed based on biometric characteristics such as a face feature, a voiceprint feature, a fingerprint feature, an iris feature, a vein feature, or the like.

The additional map illustrated in FIG. 13 is provided for illustrative purposes. A father may move towards a wardrobe and then towards the exit during an hour of 20:00 to 21:00, for example. In this case, more than a predetermined number of occurrences may be continuously detected in which the destination of the move is the bathroom and the purpose of the move is to take a bath. This relationship is then added to the additional map as one of the additional relationships. Further, a mother may enter through the entrance during an hour of 17:00 to 18:00 to move towards the corridor. In this case, more than a predetermined number of occurrences may be continuously detected in which the destination of the move is the kitchen and the purpose of the move is cooking. This relationship is then added to the additional map as one of the additional relationships.

The same also applies in the case of a brother and a sister. A brother may enter through the entrance during an hour of 17:00 to 18:00 to move towards the corridor. In this case, more than a predetermined number of occurrences may be continuously detected in which the destination of the move is the bedroom assigned to the brother and the purpose of the move is a change of clothes. This relationship is then added to the additional map as one of the additional relationships. As for the sister, more than a predetermined number of occurrences may be continuously detected in which the sister enters through the entrance during an hour of 15:00 to 16:00 to go to the bedroom assigned to her and the purpose of the move is a change of clothes. This relationship is then added to the additional map as one of the additional relationships.

The prediction unit 9a of the server 9 predicts the destination of a person on the move and the purpose of the move based on personal belongings and/or behavior patterns, accompanying information indicative of an hour and personal classification information, the map indicative of relationships stored in the memory unit 9k, and the additional map indicative of additional relationships.

A behavior included in the behavior patterns detected by the behavior-pattern detecting unit 9f may not match any one of the behaviors included in the map indicative of relationships or the additional map indicative of additional relationships. In this case, the prediction unit 9a of the server 9 terminates the prediction that is based on the map indicative of relationships or the additional map indicative of additional relationships, and predicts the destination of move based on any one of the direction, speed, and acceleration of the person's flow line, a line of sight, and a personal belonging.

Based on the prediction made by the prediction unit 9a of the server 9, the control unit 9b of the server 9 performs control as follows. Main equipment situated at the destination of the person on the move as predicted by the prediction unit 9a is selected and controlled. Further, the main equipment that matches the purpose of the move among the main equipment situated at the destination of the person on the move as predicted by the prediction unit 9a is selected and controlled to be in a standby state inclusive of preheating control.

The destination of the move when predicted by the prediction unit 9a may be predicted together with the purpose of the move. Accordingly, control may be performed by taking into account, and making a distinction between the intermediate destination that will be simply passed by and the final destination at which main equipment or sub-equipment is operated according to the purpose. Sub-equipment may include the lighting units 14 and the air-conditioning units 15, which are provided in the respective areas of the building. The control unit 9b selects and controls such sub-equipment in accordance with the destination of the move predicted by the prediction unit 9a.

More specifically, the prediction unit 9a predicts the destinations of the move, and, then, the control unit 9b activates sub-equipment corresponding to the areas to which the destinations belong. Namely, the lighting units 14 are lit, and the air-conditioning units 15 are powered on in the final destination and the intermediate destination. When a person steps out of the living room into the corridor with an aim of moving to the restroom, for example, the lighting units 14(3,7) and the air-conditioning units 15(3,7) in the corridor and the restroom are turned on.

In addition, the human-flow-line detecting unit 9c of the server 9 may detect that a person has reached the area to which the intermediate destination belongs. In response, the control unit 9b deactivates sub-equipment corresponding to the area through which the person passed before reaching the area to which the intermediate destination belongs. When a person steps out of the living room into the corridor with an aim of moving to the restroom, for example, the lighting unit 14(2) and the air-conditioning unit 15(2) in the living room are turned off.

In addition, the control unit 9b deactivates sub-equipment when the human-flow-line detecting unit 9c detects, based on images captured by the cameras 22 to 27, that no other person is present in the area through which the person passed before reaching the area to which the intermediate destination belongs. Alternatively, the control unit 9b deactivates sub-equipment in response to the number of counts being equal to zero after the human-flow-line detecting unit 9c counts the number of people staying in the area through which the person passed before reaching the area to which the intermediate destination belongs.

In addition, the human-flow-line detecting unit 9c may detect that a person has reached the area to which the final destination belongs. In response, the control unit 9b deactivates sub-equipment corresponding to the area through which the person passed before reaching the area to which the final destination belongs. When a person steps out of the living room into the corridor and then reaches the restroom, for example, the lighting unit 14(4) and the air-conditioning unit 15(4) in the corridor are turned off.

In addition, the control unit 9b deactivates sub-equipment when the human-flow-line detecting unit 9c detects based on images that no other person is present in the area through which the person passed before reaching the area to which the final destination belongs. Alternatively, the control unit 9b deactivates sub-equipment in response to the number being equal to zero after the human-flow-line detecting unit 9c counts the number of people staying in the area preceding the area to which the final destination belongs.

Figure 14:
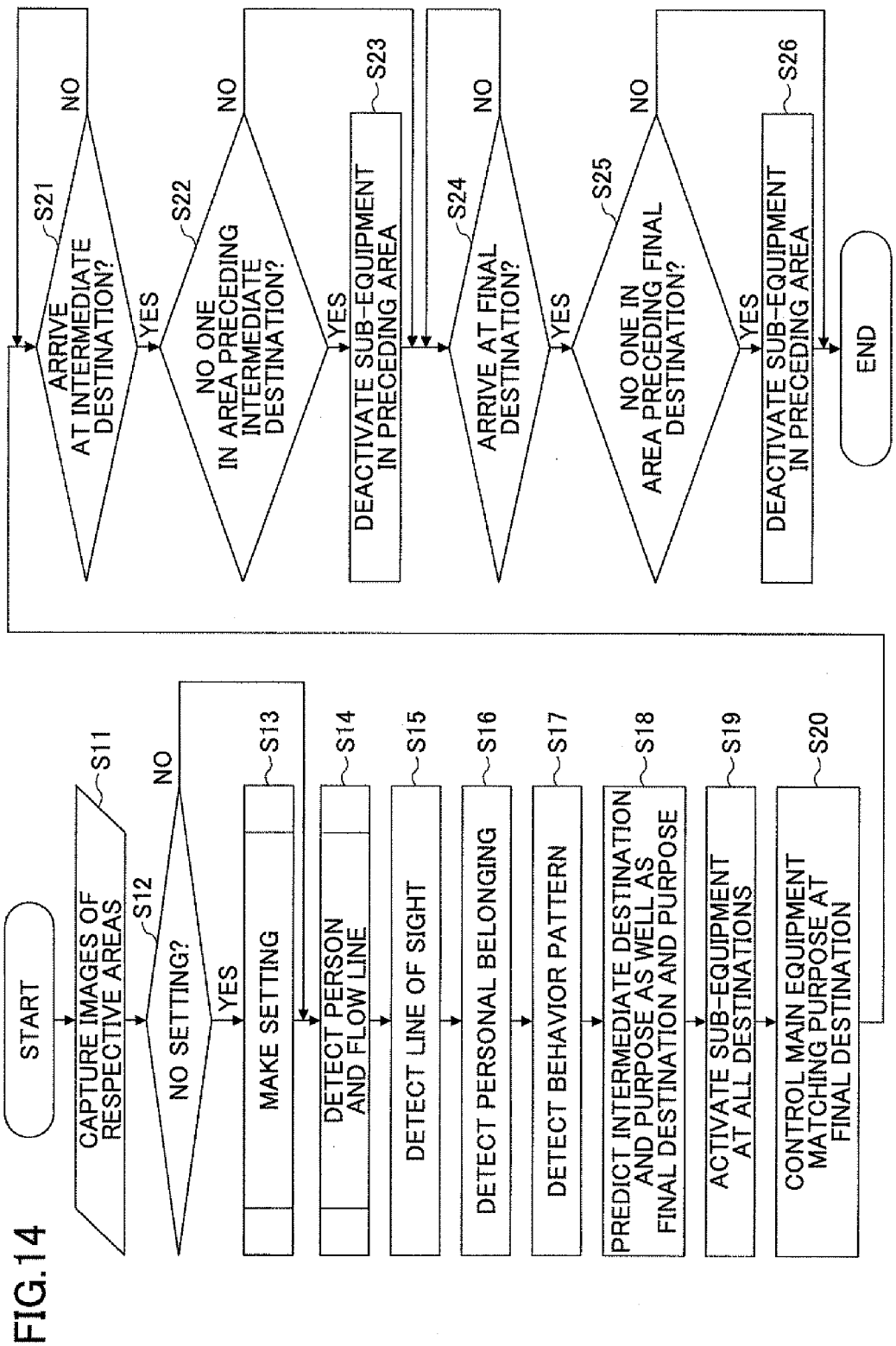
FIG. 14 is a flowchart illustrating the control performed by the embodiment of the building management apparatus according to the present invention.

In the following, the control performed by the building management apparatus 1 described above will be described by use of a flowchart. FIG. 14 is a flowchart illustrating the control performed by the building management apparatus 1 according to the present invention.

In S11, the cameras 22 to 27 described above capture images of respective areas. In S22, the setting unit 9*l* of the server 9 checks whether no setting has been made, i.e., whether the setting process described above has come to an end. In the case of affirmation, the procedure proceeds to S13 in which a setting process is performed. The processes of the setting illustrated in S13 are the same as those of the subroutine illustrated in FIG. 4, and are equivalent to the processes of S3 illustrated in FIG. 3 of the first embodiment. A duplicate description will be omitted.

In S14 illustrated in FIG. 14, the human-flow-line detecting unit 9*c* of the server 9 detects people and the flow lines of the people in the images of respective areas. The processes of the detection of a person and a flow-line illustrated in S14 are the same as those of the subroutine illustrated in FIG. 6, and are equivalent to the processes of S4 illustrated in FIG. 3 of the first embodiment. A duplicate description will be omitted.

In S15 of FIG. 14, the line-of-sight detecting unit 9*d* of the server 9 detects the person's line of sight from the images captured by the cameras 22 to 27. In S16, the personal-belonging detecting unit 9*e* of the server detects the person's personal belongings. In S17, the behavior-pattern detecting unit 9*f* of the server detects the person's behavior pattern.

Subsequently in S18, the prediction unit 9*a* of the server 9 predicts the intermediate and final destinations of the person on the move and the purpose of the move based on the map illustrated in FIG. 12 and the additional map illustrated in FIG. 13. In S19, the control unit 9*b* of the server 9 controls and activates some of the sub-equipment situated at the destinations, i.e., those of the lighting units 14(2-7) and the air-conditioning units 15(2-7) which are situated at the destinations.

In S18, a behavior may be detected that is not any one of the behaviors included in the map illustrated in FIG. 12 or the map illustrated in FIG. 13. In this case, the prediction unit 9*a* of the server 9 terminates the prediction based on a behavior pattern, and chooses to perform prediction based on any one or a combination of a flow line, a line of sight, and a personal belonging.

In addition, in S20, main equipment that matches the purpose of the move predicted by the prediction unit 9*a* in advance, e.g., the restroom facility 13 in the case of relieving oneself, is controlled to shift from a sleep state to a standby state at the final destination, e.g., the restroom when the person moves from the living room to the restroom.

In S21, further, the human-flow-line detecting unit 9*c* of the server 9 checks whether the person has reached the intermediate destination, e.g., the corridor in the case of the person moving from the living room to the restroom. In the case of affirmation, the procedure proceeds to S22. In the case of negation, the procedure returns to front of S21.

In S22, the human-flow-line detecting unit 9*c* of the server 9 counts the number of people staying in the area preceding the intermediate destination, or detects whether any person other than the person on the move is present in the area preceding the intermediate destination, thereby determining whether no other person is present in the area preceding the intermediate destination. In the case of affirmation, the procedure proceeds to S23. In the case of negation, the procedure skips S23 to proceed to S24.

In S23, the control unit 9*b* deactivates sub-equipment situated in the area preceding the intermediate destination. The procedure then proceeds to S24. In S24, the human-flow-line detecting unit 9*c* of the server 9 checks whether the person has reached the final destination. In the case of affirmation, the procedure proceeds to S25. In the case of negation, the procedure returns to front of S24.

In S25, the human-flow-line detecting unit 9*c* of the server 9 counts the number of people staying in the area preceding the final destination, or detects whether any person other than the person on the move is present in the area preceding the final destination, thereby determining whether no other person is present in the area preceding the final destination. In the case of affirmation, the procedure proceeds to S26. In the case of negation, the procedure skips S26 to come to an end of control. In S26, the control unit 9*b* deactivates sub-equipment situated in the area preceding the final destination. The control procedure then comes to an end.

The building management apparatus 21 of the second embodiment implemented by the control procedures described above brings about results and advantages as follows. Main equipment and sub-equipment are activated ahead of the movement of a person based on the prediction of a destination to which the person goes, whereas main equipment and sub-equipment in the related art are activated or deactivated by use of an infrared sensor or the like after the movement of a person. Accordingly, a time in which the control causes inconvenience or harm upon the movement of a person is eliminated as much as possible.

In the first embodiment, when a person moves from the living room toward the restroom with an aim of relieving himself or herself, for example, the final destination cannot be predicted until the person approaches the restroom after stepping out of the living room into the corridor and traveling through the corridor. In the second embodiment, on other hand, the final destination and the purpose of the move can be predicted at the time the person steps out of the living room into the corridor. With this arrangement, main equipment that is the purpose of the move is shifted from a sleep state to a standby state at earlier timing, and sub-equipment situated at the final destination and intermediate destination can be activated.

Especially in the case of the final destination being the bathroom and the purpose of the move being to take a bath, water may be preheated. This avoids the time in which the person who has moved feels inconvenience for some duration because water is not sufficiently heated at the initial stage of using shower.

Similarly, in the case of the final destination being the restroom and the purpose of the move being to relieve oneself, the lavatory seat may be preheated. This can avoid the time in which the control causes inconvenience or harm to a person whereas the lavatory seat stays cold for some duration in the case of performing preheating after the movement of the person. The same also applies in the case of the destination of the move being the kitchen and the purpose of the move being cooking, in which case the water heater 11 is preheated based on the prediction.

After a person moves out of a given area, another person may still stay in this area. In such a case, sub-equipment continues to be running, thereby avoiding causing inconvenience or harm to other people due to the stoppage of the sub-equipment upon the move of the person.

The person who moves out is not conscious of the stopping of sub-equipment such as the lighting units 14. This provides a more conformable environment.

When prediction by the prediction unit 9*a* based on the map or additional map is terminated, the memory unit 9*k* stores a behavior that does not match any one of the behaviors included in the map inclusive relationships or in the additional map inclusive of additional relationships. With this arrangement, more flexible handling can be requested to a person, family members of the person, and other people in the building when the detected behavior does not match any one of the predictions based on the map or the additional map.

For example, the prediction unit 9a may predict, based on behavior patterns, that the destination of a person walking in the corridor is the bathroom, but the person may go straight to the bedroom and fall asleep immediately. Alternatively, the prediction unit 9a may predict that the destination of a person walking in the corridor is the living room because this person has just gone to the restroom, but the person may go to the restroom again (i.e., the frequency of using the restroom has been high within recent days). Alternatively, it may be about the time that a person should be out of the bathroom (or the restroom), but the person may not come out (which raises a question of whether the person is laying on the floor unconscious in the bathroom or restroom). In these cases, a function may be provided such that the behavior observed at such a time is recorded in a history of anomaly cases based on the recognition that what is just observed constitutes anomaly (i.e., unusual state).

In this manner, events of small anomalies observed in everyday life are recorded and checked at constant intervals, thereby helping to preempt a catastrophic anomaly. For example, this function may be useful in order to detect a warning of disease or in order to avoid extremely disorderly life patterns.

The second embodiment described above has been directed to a case in which the building management apparatus is used in a residential house. Needless to say, the building management apparatus may also be used in offices. In the following, a third embodiment directed to such implementation will be described.

Embodiment 3

Figure 15:
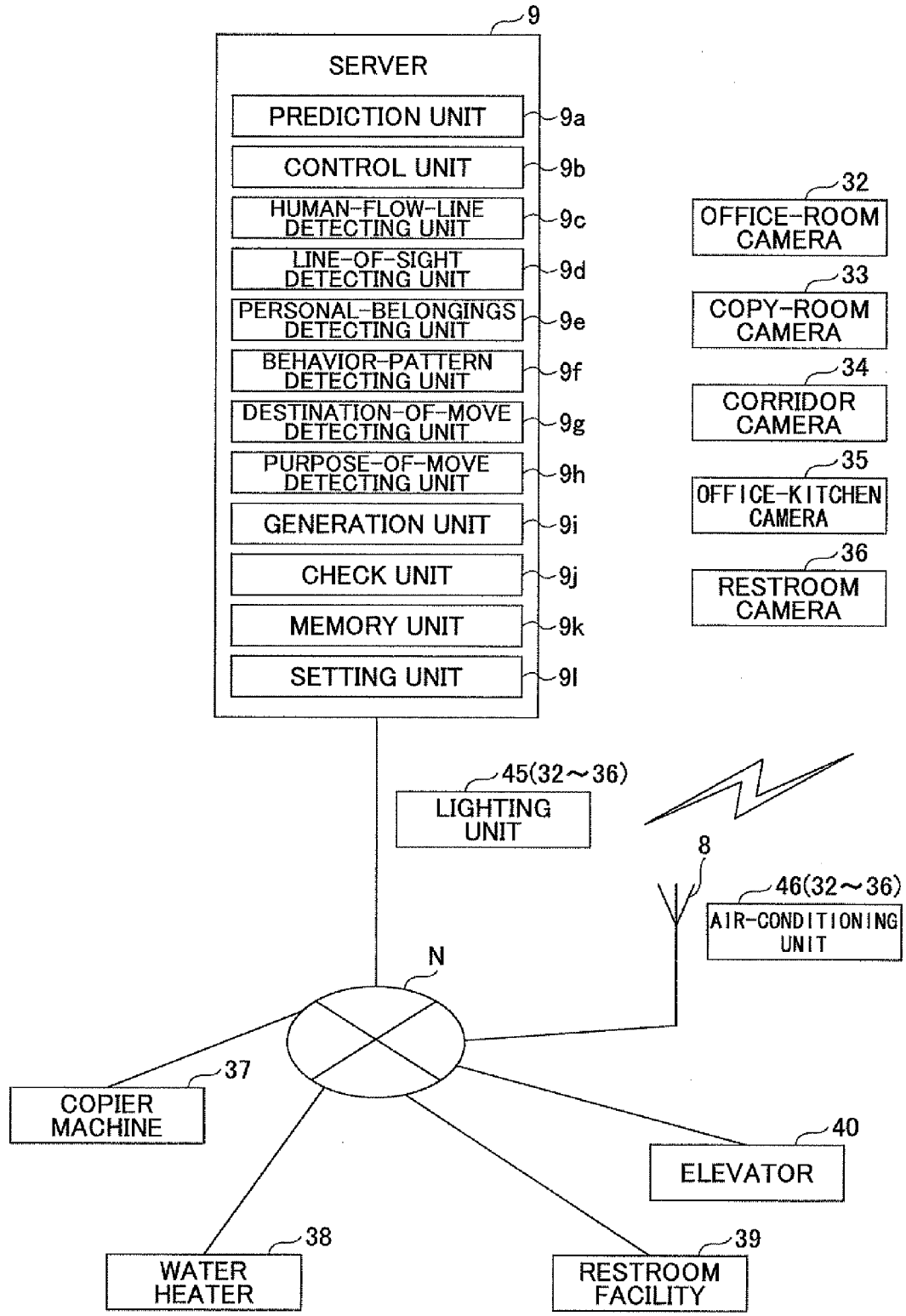
FIG. 15 is a block diagram of an embodiment of a building management apparatus according to the present invention.

FIG. 15 is an illustrative drawing of an embodiment of a building management apparatus according to the present invention. FIG. 16 is a map used in the embodiment of a building management apparatus according to the present invention. In this example, a building also has a plurality of areas. These areas may include an office room, a copy room, a corridor, an office kitchen, and a restroom.

As illustrated in FIG. 15, a building management apparatus 31 includes an office-room camera 32 provided in the office room in the building, a copy-room camera 33 provided in the copy room, a corridor camera 34 provided in the corridor, an office-kitchen camera 35 provided in the office kitchen, a restroom camera 36 provided in the restroom, an antenna 8 and a server 9 provided in the office room, for example, a copier machine 37 provided in the copy room, a water heater 38 provided in the office kitchen, a restroom facility 39 provided in the restroom, an elevator 40 provided at some location along the corridor, and lighting units 45(32-36) and air-conditioning units 46(32-36) provided in respective areas. The same elements as those illustrated in FIG. 1 are referred to by the same symbols, and a duplicate description will be omitted.

Symbol 32 shown in parentheses indicates that the item belongs to the office room. Symbol 33 indicates that the item belongs to the copy room. Symbol 34 indicates that the item belongs to the corridor. Symbol 35 indicates that the item belongs to the office kitchen. Symbol 36 indicates that the item belongs to the restroom.

The office-room camera 32, the copy-room camera 33, the corridor camera 34, the office-kitchen camera 35, the restroom camera 36, the server 9, the copier machine 37, the water heater 38, the restroom facility 39, the elevator 40, the lighting units 45, and the air-conditioning units 46 are connected together through an indoor ubiquitous network N similar to that of the first embodiment, with or without the antenna 8 intervening therebetween.

The office-room camera 32, the copy-room camera 33, the corridor camera 34, the office-kitchen camera 35, the restroom camera 36 are CCD cameras or CMOS cameras, and may be arranged at one of the four corner positions of the ceiling from which an entire view of a corresponding area can be taken.

The cameras 32-36 serve as a plurality of imaging units, and capture an image of a corresponding room or corridor with a relatively high resolution that allows a person's line of sight, personal belongings, and behavior patterns to be detected. Information inclusive of the captured images is transmitted to the server 9 through the indoor ubiquitous network N.

The server 9 is similar to the one illustrated in FIG. 2, and includes a CPU 71, a main memory device 72, a storage device 73 such as an HDD, a display device 74, an input device 75, a drive device 76, and a communication device 77. As illustrated in FIG. 15, the server 9 serves as a prediction unit 9a, a control unit 9b, a human-flow-line detecting unit 9c, a line-of-sight detecting unit 9d, a personal-belonging detecting unit 9e, a behavior-pattern detecting unit 9f, a destination-of-move detecting unit 9g, a purpose-of-move detecting unit 9h, a generation unit 9i, a check unit 9j, a memory unit 9k, and a setting unit 9l.

Processes performed by these units and the basic functions of the building management apparatus 31 are the same as or similar to those of the second embodiment. The flowchart is also the same as or similar to the one illustrated in FIG. 14. A duplicate description will be omitted.

In this example, a map stored in the memory unit 9k is illustrated in FIG. 16. A person may pick up a document and move towards the exit of the office room, followed by staring at the copy room. In this case, it may be reasonable to assume that the destination of the move is the copy room and the purpose of the move is to make a copy. This relationship is specified in the map in advance. Alternatively, a person may move towards the exit of the office room, and may then stare at the elevator 40. In this case, it may be reasonable to assume that the destination of the move is the elevator and the purpose of the move is to go to another floor. This relationship is specified in the map in advance.

The prediction unit 9a of the server 9 predicts the destination of a person on the move and the purpose of the move based on personal belongings and/or behavior patterns and the map stored in the memory unit 9k as illustrated in FIG. 16. Based on the prediction made by the prediction unit 9a of the server 9, the control unit 9b of the server 9 selects and controls main equipment situated at the destination of the person predicted by the prediction unit 9a. The control unit 9b of the server 9 selects main equipment that matches the purpose of the move among the main equipment situated at the destination of the person predicted by the prediction unit 9a, and controls the selected main equipment to place it in a standby state.

The prediction unit 9a may predict that the destination of the move is the copy room and the purpose of the move is to make a copy, for example. In this case, the control unit 9b controls the copier machine 37 such that the copier machine 37 is shifted from a sleep state to a standby state. Similarly, the prediction unit 9a may predict that the destination of the move is the elevator 40 and the purpose of the move is to go to another floor. In this case, the control unit 9b controls the elevator 40 such that the elevator 40 moves in advance to the floor in which the office room is situated.

Sub-equipment that belongs to the intermediate destination which will be simply passed by, i.e., the lighting units 45(34) and the air-conditioning units 46(34) in the corridor, are also controlled and activated by the control unit 9b in advance when the prediction unit 9a predicts the destination of the move and the purpose of the move. The same or similar control is performed in the case of the destination of the move being the office kitchen and the purpose of the move being to get hot water, or in the case of the destination of the move being the restroom and the purpose of the move being to relieve oneself.

With these arrangements, the copier machine 37, the water heater 38, the restroom facility 39, and the elevator 40 are controlled in accordance with the destination of a move and the purpose of a move upon predictions of the destination and purpose of the move of a person in the office. Accordingly, the time in which people in the office feel inconvenience is prevented as much as possible. Further, the people are provided with a sense of security to feel as if they were watched over by the office. This improves convenience and laborsaving, and also enhance security. In this manner, diligent services are provided to people in the office, and, also, energy saving and reduction in electric power can be accomplished.

The third embodiment described above has been directed to a case in which the building management apparatus is used in offices. Needless to say, the building management apparatus may also be used in a hospital. In the following, a fourth embodiment directed to such implementation will be described.

In the fourth embodiment, the lighting units and air-conditioning units are treated as main equipment rather than as sub-equipment.

Embodiment 4

Figure 17:
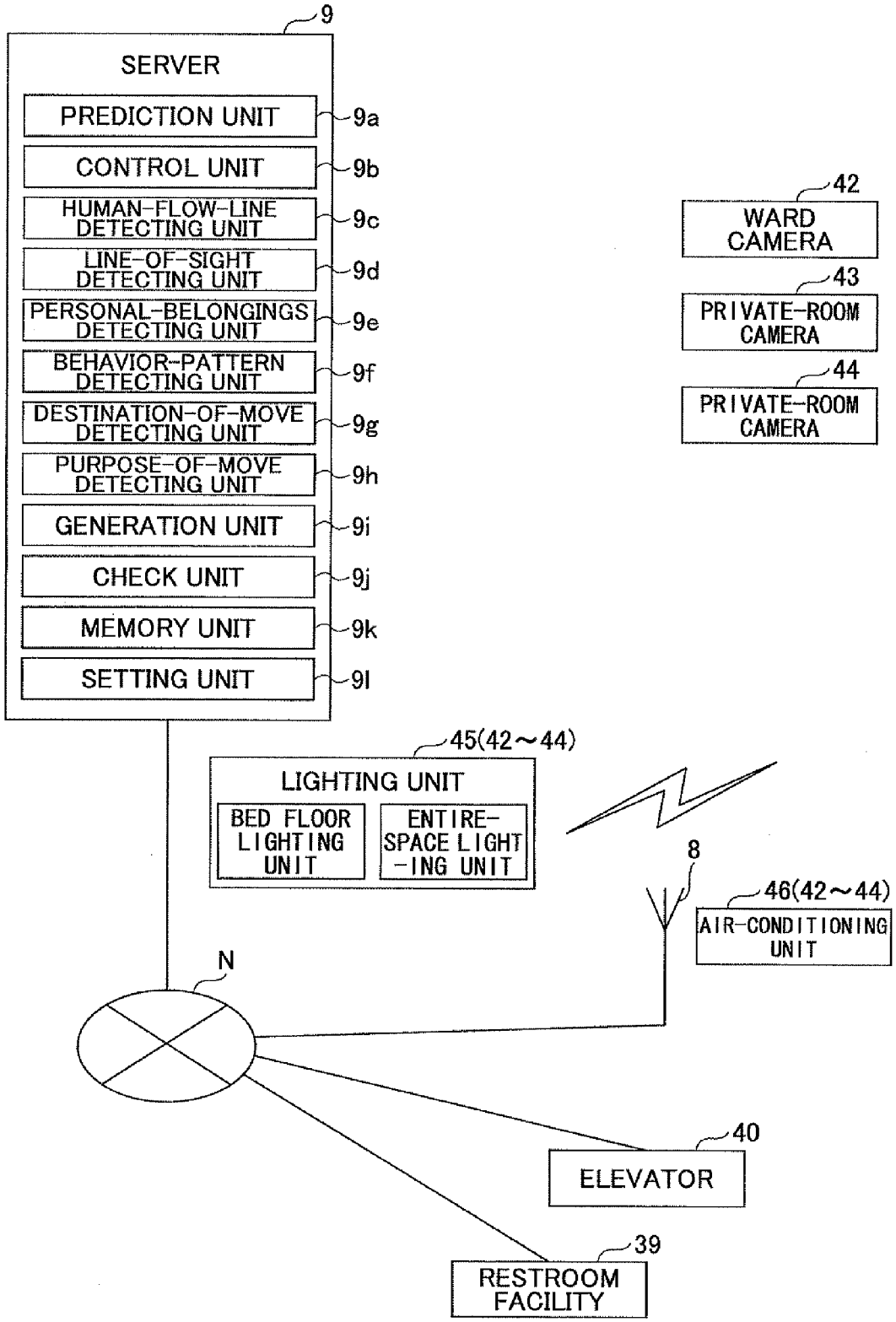
FIG. 17 is a block diagram of an embodiment of a building management apparatus according to the present invention.

FIG. 17 is an illustrative drawing of an embodiment of a building management apparatus according to the present invention. FIG. 18 is a map used in the embodiment of a building management apparatus according to the present invention. In this example, a building also has a plurality of areas. These areas may include a ward and private patient rooms.

As illustrated in FIG. 17, a building management apparatus 41 includes a ward camera 42 provided in the ward of the hospital which is a building, private-room cameras 43 and 44 provided in private patient rooms, an antenna 8 and a server 9 provided in the ward, for example, a restroom facility 39 provided in the restroom, an elevator 40 provided at some location along the corridor, and lighting units 45(42-44) and air-conditioning units 46(42-44) provided in the respective ward and private patient rooms. The same elements as those illustrated in FIG. 1 are referred to by the same symbols, and a duplicate description will be omitted. The lighting units 45 include a bed floor lighting unit for providing light to the floor around a bed and an entire-space lighting unit for providing light to the entire space of the room.

Symbol 42 shown in parentheses indicates that the item belongs to the ward. Symbols 43 and 44 indicate that the item belongs to a private patient room.

The ward camera 42, the private-room cameras 43 and 44, the restroom facility 39, the elevator 40, the lighting units 45, and the air-conditioning units 46 are connected together through an indoor ubiquitous network N similar to that of the first embodiment, with or without the antenna 8 intervening therebetween.

The ward camera 42 and the private-room cameras 43 and 44 are CCD cameras or CMOS cameras, and may be arranged at one of the four corner positions of the ceiling from which an entire view of a corresponding area can be taken.

The cameras 42-44 serve as a plurality of imaging units, and capture an image of a corresponding patient room with a relatively high resolution that allows a person's line of sight, personal belongings, and behavior patterns to be detected. Information inclusive of the captured images is transmitted to the server 9 through the indoor ubiquitous network N.

Similar to the one illustrated in FIG. 2, the server 9 includes a CPU 71, a main memory device 72, a storage device 73 such as an HDD, a display device 74, an input device 75, a drive device 76, and a communication device 77. As illustrated in FIG. 15, the server 9 serves as a prediction unit 9a, control unit 9b, human-flow-line detecting unit 9c, a line-of-sight detecting unit 9d, a personal-belonging detecting unit 9e, a behavior-pattern detecting unit 9f, a destination-of-move detecting unit 9g, a purpose-of-move detecting unit 9h, a generation unit 9i, a check unit 9j, a memory unit 9k, and a setting unit 9l.

Processes performed by these units and the basic functions of the building management apparatus 31 are the same as or similar to those of the second embodiment. The flowchart is also the same as or similar to the one illustrated in FIG. 14. A duplicate description will be omitted.

In this example, a map stored in the memory unit 9k is illustrated in FIG. 18. A person in the ward may get up from the bed, i.e., sit up in the bed. In this case, it may be reasonable to assume that the destination of the move is a switch panel for controlling the lighting units 45 in the ward and the purpose of the move is to turn on the lights. This relationship is then specified in the map.

The prediction unit 9a of the server 9 predicts the destination of a person on the move and the purpose of the move based on a behavior pattern and a map stored in the memory unit 9k as illustrated in FIG. 18. Based on the prediction unit 9a of the server 9, the control unit 9b of the server 9 controls the lighting units 45 such that the lighting units 45 cast light only to the floor around the bed on which the person sit up. When a person in a private patient room sits up, both the bed floor lighting unit and the entire-space lighting unit may be turned on.

With these arrangements, people in the patient rooms are provided with a sense of security to feel as if they were watched over by the hospital. These arrangements also improve convenience and laborsaving, and also enhance security. In this manner, diligent services are provided to people in the hospital, and, also, energy saving and reduction in electric power can be accomplished.

The preferred embodiments of the present invention have been described heretofore. The present invention is not limited to these embodiments, but various variations and modifications may be made to these embodiments without departing from the scope of the present invention.

INDUSTRIAL APPLICABILITY

The present invention is directed to a building management apparatus, and provides a building management apparatus that can provide a comfortable environment based on diligent control. The present invention is useful and applicable to a building such as a residential house, an office, a factory, a hospital, or the like.

This international application claims foreign priority to Japanese Patent Application No. 2008-193786 filed on Jul. 28, 2008, the entire contents of which are incorporated herein by reference.

DESCRIPTION OF REFERENCE SYMBOLS 1 building management apparatus
2 living-room camera
3 kitchen camera
4 corridor camera
5 bedroom camera
6 bathroom camera
7 restroom camera
8 antenna
9 server
9a prediction unit
9b control unit
9c human-flow-line detecting unit
9d line-of-sight detecting unit
9e personal-belonging detecting unit
9f behavior-pattern detecting unit
9g destination-of-move detecting unit
9h purpose-of-move detecting unit
9i generation unit
9j check unit
9k memory unit
9l setting unit
10 AV unit
11 water heater
12 bathroom facility
13 restroom facility
14 lighting unit
15 air-conditioning unit
21 building management apparatus
22 living-room camera
23 kitchen camera
24 corridor camera
25 bedroom camera
26 bathroom camera
27 restroom camera
31 building management apparatus
32 office-room camera
33 copy-room camera
34 corridor camera
35 office-kitchen camera
36 restroom camera
37 copy machine
38 water heater
39 restroom facility
40 elevator
41 building management apparatus
42 ward camera
43 private-room camera
44 private-room camera
45 lighting unit
46 air-conditioning unit
71 CPU
72 main memory device
73 storage device
74 display device
75 input device
76 drive device
77 communication device

The invention claimed is:

1. A building management apparatus in a building having a plurality of areas, comprising:
 a central processing unit to execute various functions of the building management apparatus;
 a prediction unit to predict a destination of a move of a person;
 a control unit to control equipment inclusive of main equipment or sub-equipment installed in the building based on the destination of the move;
 one or more imaging units to capture images of at least one of the plurality of areas; and
 a human-flow-line detecting unit to detect a person and a flow line of the person from the images captured by the imaging units,
 wherein the prediction unit predicts the destination of the move of the person based on the flow line,
 wherein the destination is a future destination of the person,
 wherein the prediction unit predicts the destination of the move of the person based on a speed or acceleration of the flow line,
 wherein the building management apparatus further comprises:
 a line-of-sight detecting unit to detect the person's line of sight from the images captured by the imaging units, wherein the prediction unit predicts the destination of the move of the person based on the line of sight,
 a personal-belonging detecting unit to detect the person's personal belonging from the images captured by the imaging units, wherein the prediction unit predicts the destination of the move of the person and the purpose of the move based on the personal belonging,
 a behavior-pattern detecting unit to detect the person's behavior pattern based on any one or a combination of the images captured by the imaging units, the flow line, the line of sight, and the personal belonging, wherein the prediction unit predicts the destination of the move of the person and the purpose of the move based on the behavior pattern,
 a memory unit to store predetermined relationships between at least one of the personal belonging and the behavior pattern and a set of the destination of the move and the purpose of the move, wherein the prediction unit predicts the destination of the move of the person and the purpose of the move based on at least one of the personal belonging and the behavior pattern and the relationships stored in the memory unit,
 a plurality of imaging units, which are the above-noted imaging units, operable to capture images of the plurality of areas;
 a destination-of-move detecting unit to detect the destination of the move to which the person has actually moved based on the images or the flow line;
 a purpose-of-move detecting unit to detect the purpose of the move of the person based on whether an operation is performed with respect to the equipment situated in the destination of the move to which the person has actually moved; and
 a generation unit to generate an additional relationship that links the behavior pattern detected by the behavior-pattern detecting unit to the destination of the move and the purpose of the move, and
 wherein the memory unit stores the additional relationship.

2. The building management apparatus as claimed in claim 1, wherein the generation unit generates the additional relationship by linking together the behavior pattern, the destination of the move and the purpose of the move, and accompanying information.

3. The building management apparatus as claimed in claim 2, further comprising a check unit to identify a room to which the person is assigned based on personal classification information and the person's behavior pattern, wherein the accompanying information includes at least one of an hour, a day, a temperature, a humidity, weather, personal classification information, and a room to which the person belongs.

4. The building management apparatus as claimed in claim 3, wherein the prediction unit predicts the destination of the move of the person and the purpose of the move based on the behavior pattern detected by the behavior-pattern detecting unit, the relationships, and the additional relationship.

5. The building management apparatus as claimed in claim 4, wherein the prediction unit terminates a prediction based on the relationships and the additional relationship upon detecting, among behaviors included in the behavior pattern detected by the behavior-pattern detecting unit, a behavior that does not match any one of the behaviors included in the relationships or the additional relationship.

6. The building management apparatus as claimed in claim 5, wherein the memory unit stores a behavior that does not match any one of the behaviors included in the relationships or the additional relationship.

7. The building management apparatus as claimed in claim 6, wherein the control unit selects and controls the main equipment that matches the purpose of the move among the main equipment situated at the destination of the move of the person predicted by the prediction unit.

8. A building management apparatus in a building having a plurality of areas, comprising:
a central processing unit to execute various functions of the building management apparatus;
a prediction unit to predict a destination of a move of a person;
a control unit to control equipment inclusive of main equipment or sub-equipment installed in the building based on the destination of the move;
one or more imaging units to capture images of at least one of the plurality of areas; and
a human-flow-line detecting unit to detect a person and a flow line of the person from the images captured by the imaging units,
wherein the prediction unit predicts the destination of the move of the person based on the flow line,
wherein the destination is a future destination of the person,
wherein the prediction unit predicts the destination of the move of the person based on a speed or acceleration of the flow line,
wherein the control unit places the main equipment situated at the destination of the move in a standby state,
wherein the building management apparatus further comprises a setting unit to make a setting by extracting structures of the plurality of areas, shapes and sizes of items situated in the plurality of areas, and positional relationships between the items,
wherein the control unit selects and controls the main equipment situated at the destination of the move of the person predicted by the prediction unit, and
wherein the destination of the move includes both an intermediate destination and a final destination, and the sub-equipment is situated in respective ones of the plurality of areas in the building, and wherein the control unit selects and controls the sub-equipment based on the destination of the move of the person predicted by the prediction unit.

9. The building management apparatus as claimed in claim 8, wherein the prediction unit predicts the destination of the move, and, then, the control unit activates the sub-equipment corresponding to the areas to which the destinations belong.

10. The building management apparatus as claimed in claim 9, wherein when the human-flow-line detecting unit detects that the person has reached an area to which the intermediate destination or the final destination belongs, the control unit deactivates the sub-equipment corresponding to an area through which the person passed before reaching the area to which the intermediate destination or the final destination belongs.

11. The building management apparatus as claimed in claim 10, wherein the human-flow-line detecting unit counts, based on the images, a number of people staying in the area through which the person passed before reaching the area to which the intermediate destination or the final destination belongs, and the control unit deactivates the sub-equipment in response to the number being equal to zero.

* * * * *